US012216912B2

(12) United States Patent
Choi et al.

(10) Patent No.: US 12,216,912 B2
(45) Date of Patent: Feb. 4, 2025

(54) OPERATION METHOD OF MEMORY CONTROLLER CONFIGURED TO CONTROL MEMORY DEVICE

(71) Applicant: Samsung Electronics Co., Ltd., Suwon-si (KR)

(72) Inventors: Seonghyeog Choi, Hwaseong-si (KR); Dong-Min Shin, Seoul (KR); Hong Rak Son, Anyang-si (KR); Hyeonjong Song, Suwon-si (KR); Yeongcheol Jo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 225 days.

(21) Appl. No.: 17/885,823

(22) Filed: Aug. 11, 2022

(65) Prior Publication Data

US 2023/0092380 A1  Mar. 23, 2023

(30) Foreign Application Priority Data

Sep. 17, 2021  (KR) .................... 10-2021-0124657

(51) Int. Cl.
*G06F 3/00* (2006.01)
*G06F 3/06* (2006.01)

(52) U.S. Cl.
CPC .......... *G06F 3/0619* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| 8,296,620 | B2 | 10/2012 | Chen et al. |
| 8,601,347 | B1 * | 12/2013 | Koseki ............... G06F 11/1048 714/764 |
| 8,880,977 | B2 | 11/2014 | Sharon et al. |
| 9,319,073 | B2 | 4/2016 | Alhussien et al. |
| 9,513,991 | B2 | 12/2016 | Rho |
| 9,785,499 | B2 | 10/2017 | Cai et al. |
| 2007/0033488 | A1 | 2/2007 | Brueggen |
| 2012/0159286 | A1 * | 6/2012 | Koshiyama ......... G06F 11/1048 714/768 |
| 2013/0170295 | A1 | 7/2013 | Rho et al. |

(Continued)

FOREIGN PATENT DOCUMENTS

KR   10-2021-0038096 A   4/2021

*Primary Examiner* — Midys Rojas
(74) *Attorney, Agent, or Firm* — Harness, Dickey & Pierce, P.L.C.

(57) ABSTRACT

Disclosed herein are operation methods of a memory controller which controls a memory device. The method includes storing write data in a first area of the memory device, extracting first error position information indicating a position of at least one error included in data stored in the first area, storing the first error position information in a second area of the memory device, reading read data from the first area of the memory device, reading the first error position information from the second area of the memory device, refining the read data based on the first error position information to generate refined data, performing soft decision decoding based on the refined data to generate corrected data, and outputting the corrected data.

20 Claims, 20 Drawing Sheets

(56) References Cited

U.S. PATENT DOCUMENTS

| | | |
|---|---|---|
| 2016/0011937 A1* | 1/2016 | Miyamoto .......... G06F 11/1048 |
| | | 714/764 |
| 2017/0192845 A1 | 7/2017 | Kim et al. |
| 2020/0105350 A1 | 4/2020 | Kim |
| 2020/0371867 A1 | 11/2020 | Imaizumi et al. |
| 2021/0043261 A1 | 2/2021 | Yu et al. |
| 2021/0098070 A1 | 4/2021 | Lee |

* cited by examiner

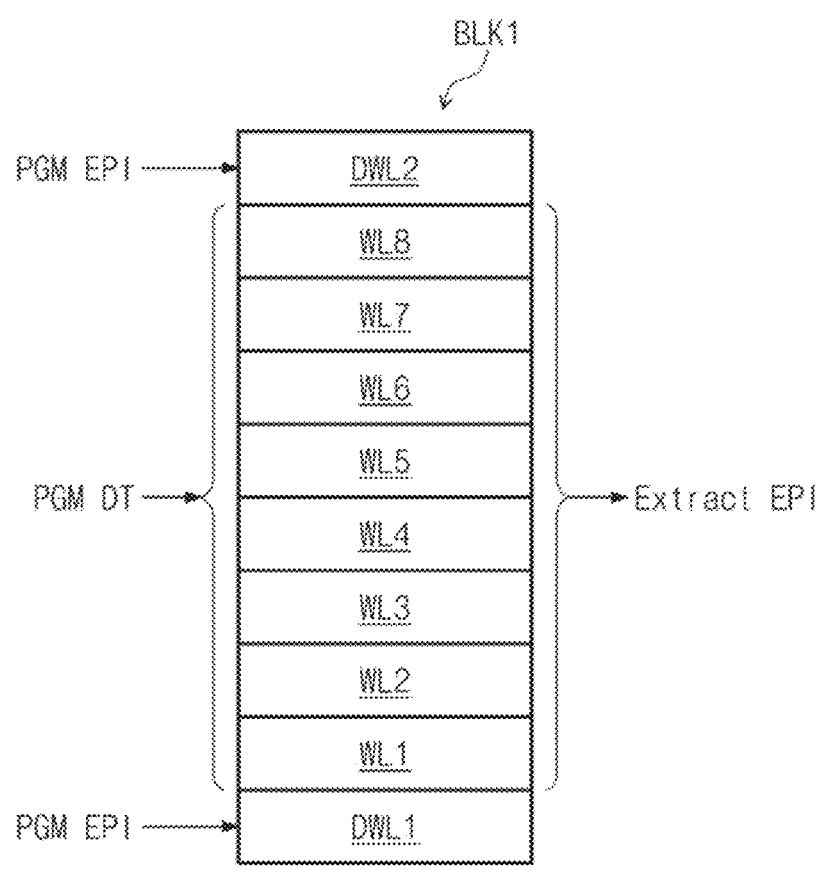

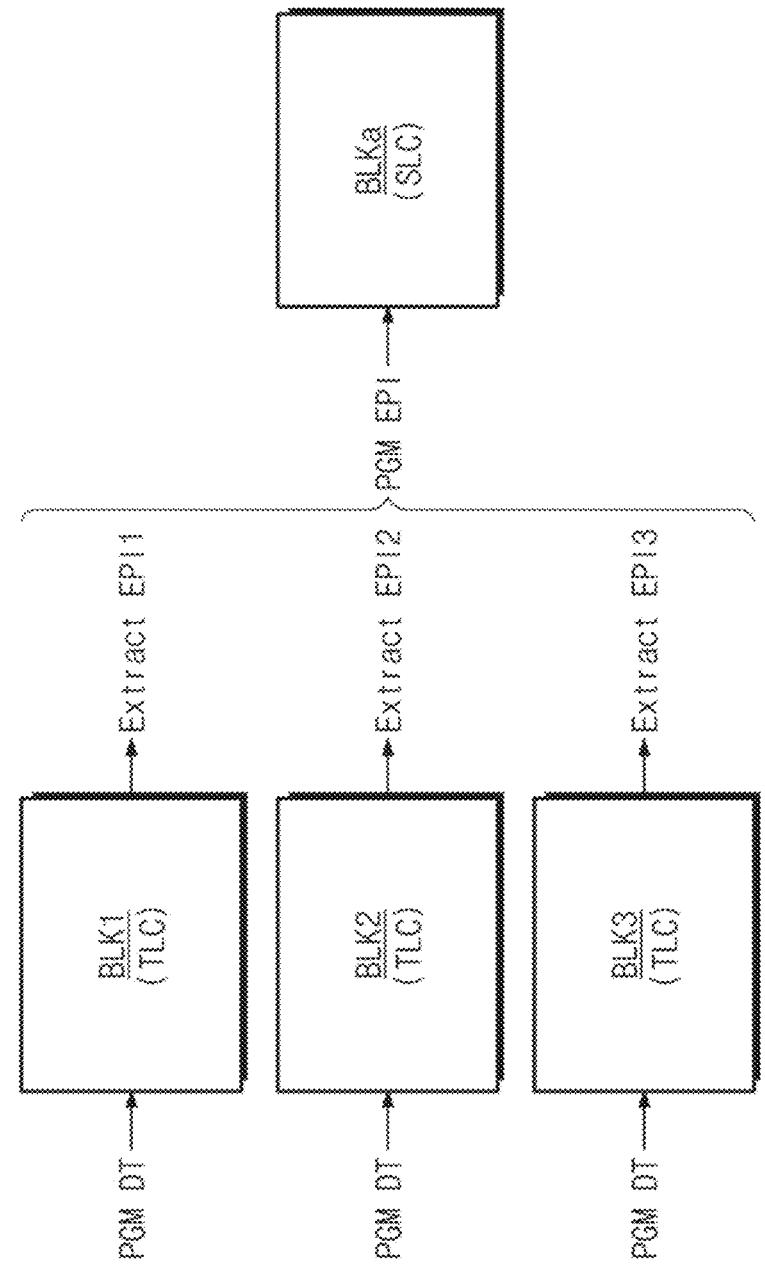

OPERATION METHOD OF MEMORY CONTROLLER CONFIGURED TO CONTROL MEMORY DEVICE

CROSS-REFERENCE TO RELATED APPLICATIONS

This application claims priority under 35 U.S.C. § 119 to Korean Patent Application No. 10-2021-0124657 filed on Sep. 17, 2021, in the Korean Intellectual Property Office, the disclosures of which are incorporated by reference herein in their entireties.

BACKGROUND

Example embodiments of the present disclosure described herein relate to semiconductor memory devices, and/or, more particularly, relate to operation methods of a storage controller configured to control a nonvolatile memory device.

A semiconductor memory device is classified as a volatile memory device, in which stored data disappear when a power supply is turned off, such as a static random access memory (SRAM) or a dynamic random access memory (DRAM), or a nonvolatile memory device, in which stored data are retained even when a power supply is turned off, such as a flash memory device, a phase-change RAM (PRAM), a magnetic RAM (MRAM), a resistive RAM (RRAM), or a ferroelectric RAM (FRAM).

The flash memory device is being widely used as a high-capacity storage medium in a computing device. The flash memory device may store data by adjusting threshold voltages of memory cells. As the number of bits to be stored per memory cell increases, a storage capacity of the flash memory device increases. However, in this case, because a read margin of each of memory cells decreases, the number of errors of data stored in the memory cells increases.

SUMMARY

Example embodiments of the present disclosure provide operation methods of a memory controller configured to control a memory device having improved reliability.

According to some example embodiments, an operation method of a memory controller which controls a memory device includes storing write data in a first area of the memory device, extracting first error position information indicating a position of at least one error included in data stored in the first area, storing the first error position information in a second area of the memory device, reading read data from the first area of the memory device, reading the first error position information from the second area of the memory device, refining the read data based on the first error position information to generate refined data, performing soft decision decoding based on the refined data to generate corrected data, and outputting the corrected data.

According to some example embodiments, an operation method of a memory controller which controls a memory device includes transmitting a first program command, a first address, and first write data to the memory device, transmitting a first read command and the first address to the memory device to receive first read data from the memory device, comparing the first read data and the first write data to extract first error position information about a position of at least one error included in the first read data, and transmitting a second program command, a second address, and the first error position information to the memory device.

According to some example embodiments, an operation method of a memory controller which controls a memory device includes performing a first read operation on a first area of the memory device to read first read data, performing a plurality of second read operations on the first area of the memory device to read a plurality of soft decision data, based on an error of the first read data not being corrected through a first error correction operation for the first read data, performing a second read operation on a second area of the memory device to read error position information, refining at least one of the plurality of soft decision data based on the error position information to generate a plurality of refined soft decision data, and performing a second error correction operation on the plurality of refined soft decision data to output corrected data.

BRIEF DESCRIPTION OF THE FIGURES

The above and other objects and features of the present disclosure will become apparent by describing in detail example embodiments thereof with reference to the accompanying drawings.

FIGS. 11A to 11D are diagrams for describing an operation in which error position information is programmed in a memory device.

DETAILED DESCRIPTION

Below, embodiments of the present disclosure may be described in detail and clearly to such an extent that an ordinary one in the art easily implements the invention.

Figure 1:
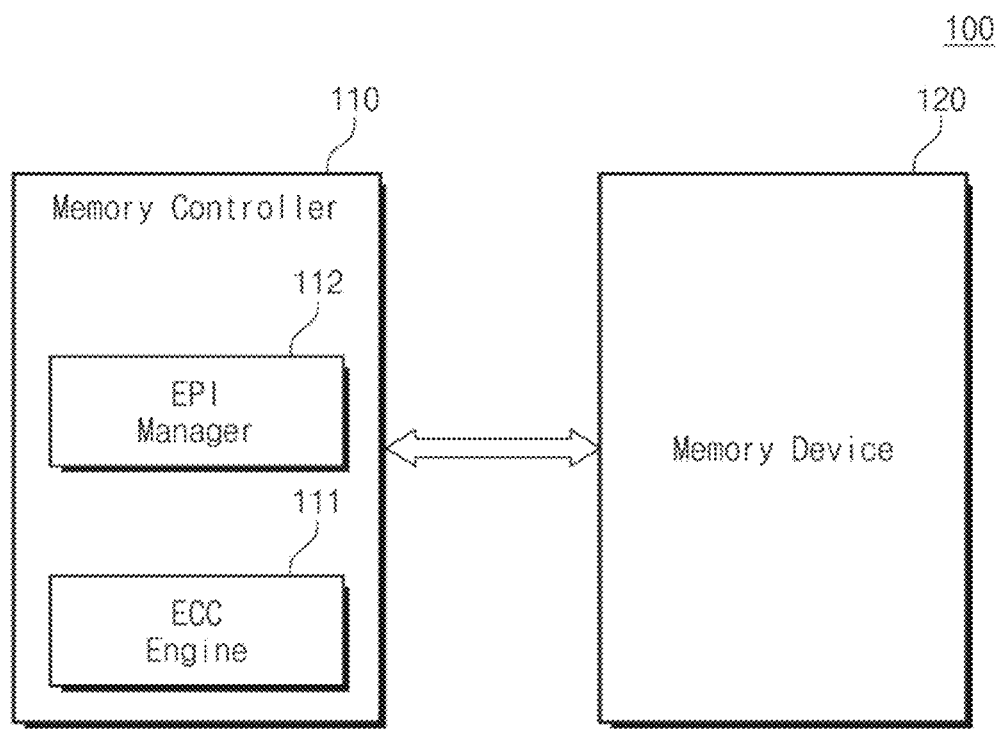
FIG. 1 is a block diagram illustrating a memory system according to some example embodiments of the present disclosure.

FIG. 1 is a block diagram illustrating a memory system according to some example embodiments of the present disclosure. Referring to FIG. 1, a memory system 100 may include a memory controller 110 and a memory device 120. In some example embodiments, the memory system 100 may be a high-capacity storage device (e.g., an SSD) configured to store data in a computing system, but the present disclosure is not limited thereto.

The memory controller 110 may be configured to control the memory device 120. For example, the memory controller 110 may store data in the memory device 120 or may read data stored in the memory device 120. The memory device 120 may operate under control of the memory controller 110. In some example embodiments, the memory device 120 may be a flash memory device, but the present disclosure is not limited thereto.

The memory controller 110 may include an error correction code (ECC) engine 111, and an error position information (EPI) manager 112. The ECC engine 111 of the memory controller 110 may be configured to detect or correct an error of data read from the memory device 120. For example, an error may occur at data stored in the memory device 120 due to a physical characteristic of the memory device 120 or various external factors. The ECC engine 111 may generate ECC data by performing an ECC encoding operation on user data to be stored in the memory device 120. The ECC data may be stored in the memory device 120 together with the user data. The ECC engine 111 may detect and correct an error included in data read from the memory device 120 by performing an ECC decoding operation on the read data and ECC data corresponding to the read data.

In some example embodiments, the ECC engine 111 may detect and correct an error of data based on a soft decision decoding scheme. Alternatively, the ECC engine 111 may correct an error by using a coded modulation such as a low density parity check (LDPC) code, a Bose, Chaudhuri, Hocquenghem (BCH) code, a turbo code, a Reed-Solomon code, a convolution code, a recursive systematic code (RSC), a trellis-coded modulation (TCM), or a block coded modulation (BCM), or various other schemes.

In some example embodiments, an error stored in the memory device 120 may occur due to various factors. As an example, when a characteristic of memory cells of the memory device 120 is degraded, an error may occur in a program operation. Alternatively, an error may occur due to various factors such as read disturb, write disturb, and a temperature change.

The memory controller 110 according to some example embodiments of the present disclosure may extract and manage an error position of data stored in the memory device 120. For example, the error position manager 112 of the memory controller 100 may extract an error position of data stored in the memory device 120. In detail, in the case where data to be stored in the memory device 120 correspond to a bit string of "11110000" and actual data (e.g., data including an error) stored in the memory device 120 correspond to a bit string of "11110001", the error position manager 112 may extract a position (e.g., an LSB position) of the bit string, at which an error occurs.

Below, the term "error position information EPI" is used for describing example embodiments of the present disclosure. The error position information EPI may be information indicating an error position in data stored in the memory device 120 (e.g., a position of a bit corresponding to an error from among bits of a bit string of the stored data). Alternatively, the error position information EPI may be information indicating a position of a memory cell at which an error occurs. That is, a position of a memory cell at which an error occurs or a position of a bit value thereof may be extracted based on the error position information EPI.

The error position information EPI extracted by the error position manager 112 may be stored in the memory device 120. The memory controller 110 may improve the reliability of data by improving data read from the memory device 120 based on the error position information EPI stored in the memory device 120. For example, in the case where data read from the memory device 120 include multiple errors, an error may not be corrected by the ECC engine 111. In this case, the memory controller 110 may refine the read data based on the error position information EPI stored in the memory device 120 and may generate the refined data. In this case, the refined data may include errors, the number of which is less than that of the read data. As such, the refined data may include an error correctable by the ECC engine 111. This may mean that the memory controller 110 may improve the reliability of data without a burden of increasing an error correction capacity of the ECC engine 111. Below, an operation of the error position manager 112 according to some example embodiments of the present disclosure will be described in detail with reference to the following drawings.

Figure 2:
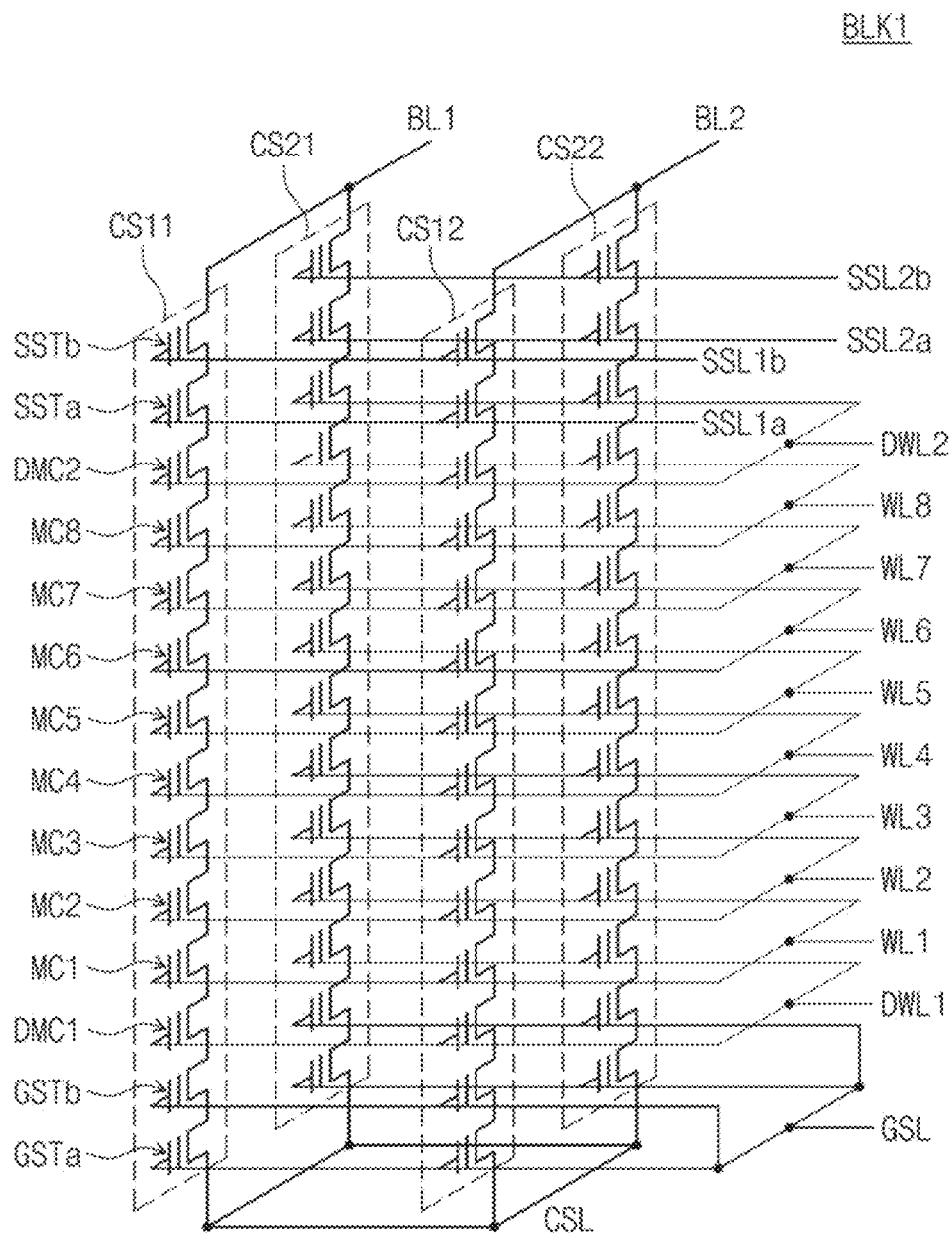
FIG. 2 is a diagram illustrating a first memory block of a plurality of memory blocks included in a memory device in FIG. 1.

FIG. 2 is a diagram illustrating a first memory block of a plurality of memory blocks included in a memory device in FIG. 1. In some example embodiments, the memory device 120 of FIG. 1 may be a flash memory device that includes a plurality of memory blocks.

A memory block of a three-dimensional structure will be described with reference to FIG. 2, but the present disclosure is not limited thereto. A memory block according to the present disclosure may have a two-dimensional memory block structure. A first memory block BLK1 will be described with reference to FIG. 2, but the present disclosure is not limited thereto. The remaining memory blocks may be similar in structure to the first memory block BLK1 to be described with reference to FIG. 2.

In some example embodiments, the first memory block BLK1 to be described with reference to FIG. 2 may correspond to a physical erase unit of the memory device 120. However, the present disclosure is not limited thereto. For example, an erase unit may be changed to a page unit, a word line unit, a sub block unit, or the like.

Referring to FIG. 2, the first memory block BLK1 may include a plurality of cell strings CS11, CS12, CS21, and CS22. The plurality of cell strings CS11, CS12, CS21, and CS22 may be arranged in a row direction and a column direction to form rows and columns.

Each of the plurality of cell strings CS11, CS12, CS21, and CS22 includes a plurality of cell transistors. For example, each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In some example embodiments, each of the plurality of cell transistors included in the cell strings CS11, CS12, CS21, and CS22 may be a charge trap flash (CTF) memory cell.

In each cell string, the plurality of memory cells MC1 to MC8 are serially connected and are stacked in a direction perpendicular to a plane defined by the row direction and the column direction, that is, in a height direction. In each cell string, the string selection transistors SSTa and SSTb are serially connected and are interposed between a bit line BL1 or BL2 and the plurality of memory cells MC1 to MC8. The ground selection transistors GSTa and GSTb are serially connected and are interposed between the plurality of memory cells MC1 to MC8 and a common source line CSL.

In some example embodiments, in each cell string, the first dummy memory cell DMC1 may be interposed between the plurality of memory cells MC1 to MC8 and the ground selection transistors GSTa and GSTb. In some example embodiments, the second dummy memory cell DMC2 may be interposed between the plurality of memory cells MC1 to MC8 and the string selection transistors SSTa and SSTb.

The ground selection transistors GSTa and GSTb of the cell strings CS11, CS12, CS21, and CS22 may be connected in common with a ground selection line GSL. In some example embodiments, ground selection transistors in the same row may be connected with the same ground selection line, and ground selection transistors in different rows may be connected with different ground selection lines. For example, the first ground selection transistors GSTa of the cell strings CS11 and CS12 in the first row may be connected with a first ground selection line, and the first ground selection transistors GSTa of the cell strings CS21 and CS22 in the second row may be connected with a second ground selection line.

In some example embodiments, although not illustrated in FIG. 2, ground selection transistors provided at the same height from a substrate (not illustrated) may be connected with the same ground selection line, and ground selection transistors provided at different heights therefrom may be connected with different ground selection lines.

Memory cells of the same height from the substrate or the ground selection transistors GSTa and GSTb are connected in common with the same word line, and memory cells of different heights therefrom are connected with different word lines. For example, the memory cells MC1 to MC8 of the cell strings CS11, CS12, CS21, and CS22 may be connected with first to eighth word lines WL1 to WL8.

String selection transistors, which belong to the same row, from among the first string selection transistors SSTa of the same height are connected with the same string selection line, and string selection transistors belonging to different rows are connected with different string selection lines. For example, the first string selection transistors SSTa of the cell strings CS11 and CS12 in the first row may be connected in common with the string selection line SSL1a, and the first string selection transistors SSTa of the cell strings CS21 and CS22 in the second row may be connected in common with the string selection line SSL2a.

Likewise, second string selection transistors, which belong to the same row, from among the second string selection transistors SSTb at the same height are connected with the same string selection line, and second string selection transistors in different rows are connected with different string selection lines. For example, the second string selection transistors SSTb of the cell strings CS11 and CS12 in the first row are connected in common with a string selection line SSL1b, and the second string selection transistors SSTb of the cell strings CS21 and CS22 in the second row may be connected in common with a string selection line SSL2b.

In some example embodiments, dummy memory cells of the same height are connected with the same dummy word line, and dummy memory cells of different heights are connected with different dummy word lines. For example, the first dummy memory cells DMC1 are connected with a first dummy word line DWL1, and the second dummy memory cells DMC2 are connected with a second dummy word line DWL2.

In some example embodiments, the first memory block BLK1 illustrated in FIG. 2 is only an example. The number of cell strings may increase or decrease, and the number of rows of cell strings and the number of columns of cell strings may increase or decrease depending on the number of cell strings. Also, the number of cell transistors (e.g., GST, MC, DMC, and SST) of the first memory block BLK1 may increase or decrease, and the height of the first memory block BLK1 may increase or decrease depending on the number of cell transistors. Also, the number of lines (e.g., GSL, WL, DWL, and SSL) connected with cell transistors may increase or decrease depending on the number of cell transistors.

Figure 3:
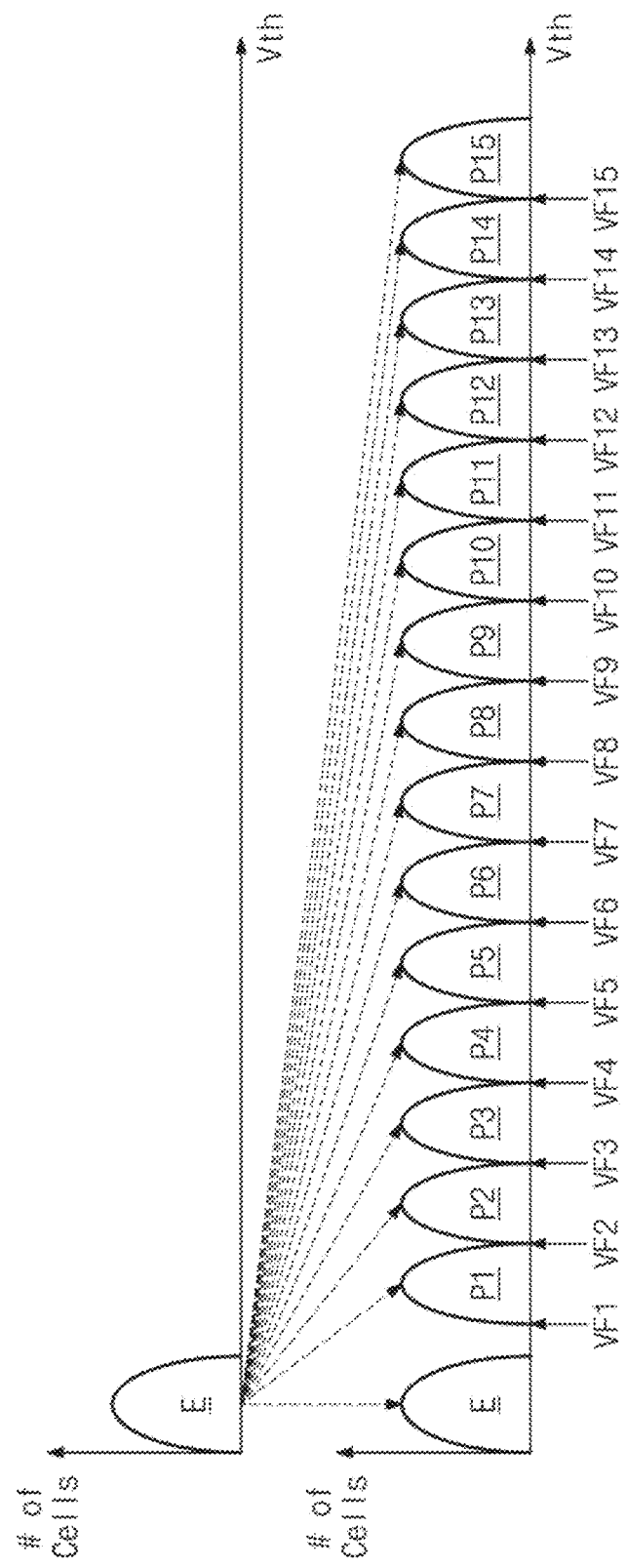
FIG. 3 is a diagram illustrating threshold voltage distributions of memory cells of FIG. 2.

FIG. 3 is a diagram illustrating threshold voltage distributions of memory cells of FIG. 2. Below, to describe example embodiments of the present disclosure, it is assumed that each of the memory cells of the memory device 120 is a quad level cell (QLC) configured to store 4-bit data. However, the present disclosure is not limited thereto. For example, each memory cell may be a single level cell (SLC) storing one bit, or a multi-level cell (MLC), a triple level cell (TLC), or a quad level cell (QLC) storing n-bit data (n being a natural number more than 1).

Referring to FIGS. 2 and 3, each of the memory cells MC1 to MC8 of the first memory block BLK1 may be programmed to have one of an erase state "E" and first to fifteenth program states P1 to P15. Whether the memory cells MC1 to MC8 are programmed normally may be verified by using first to fifteenth verification voltages VF1 to VF15.

In some example embodiments, even though whether the memory cells MC1 to MC8 are programmed normally is determined by using the first to fifteenth verification voltages VF1 to VF15, an error may occur between adjacent program states due to a physical characteristic of the memory cells MC1 to MC8 or an insufficient margin between program states. Alternatively, threshold voltages of the memory cells MC1 to MC8 may be variable due to various external factors associated with the memory cells MC1 to MC8; in this case, an error may occur at data stored in the memory cells MC1 to MC8. In the case where an error of data stored in the memory cells MC1 to MC8 exceeds an error correction capacity of the ECC engine 111, the reliability of data stored in the memory cells MC1 to MC8 fails to be guaranteed.

According to some example embodiments of the present disclosure, as the error position information EPI indicating an error position of data stored in the memory cells MC1 to MC8 is separately managed, an error of the data stored in the memory cells MC1 to MC8 may be partially refined, and an error of the refined data may not exceed the error correction capacity of the ECC engine 111. Accordingly, the reliability of the memory system 100 may be improved.

Figure 4:
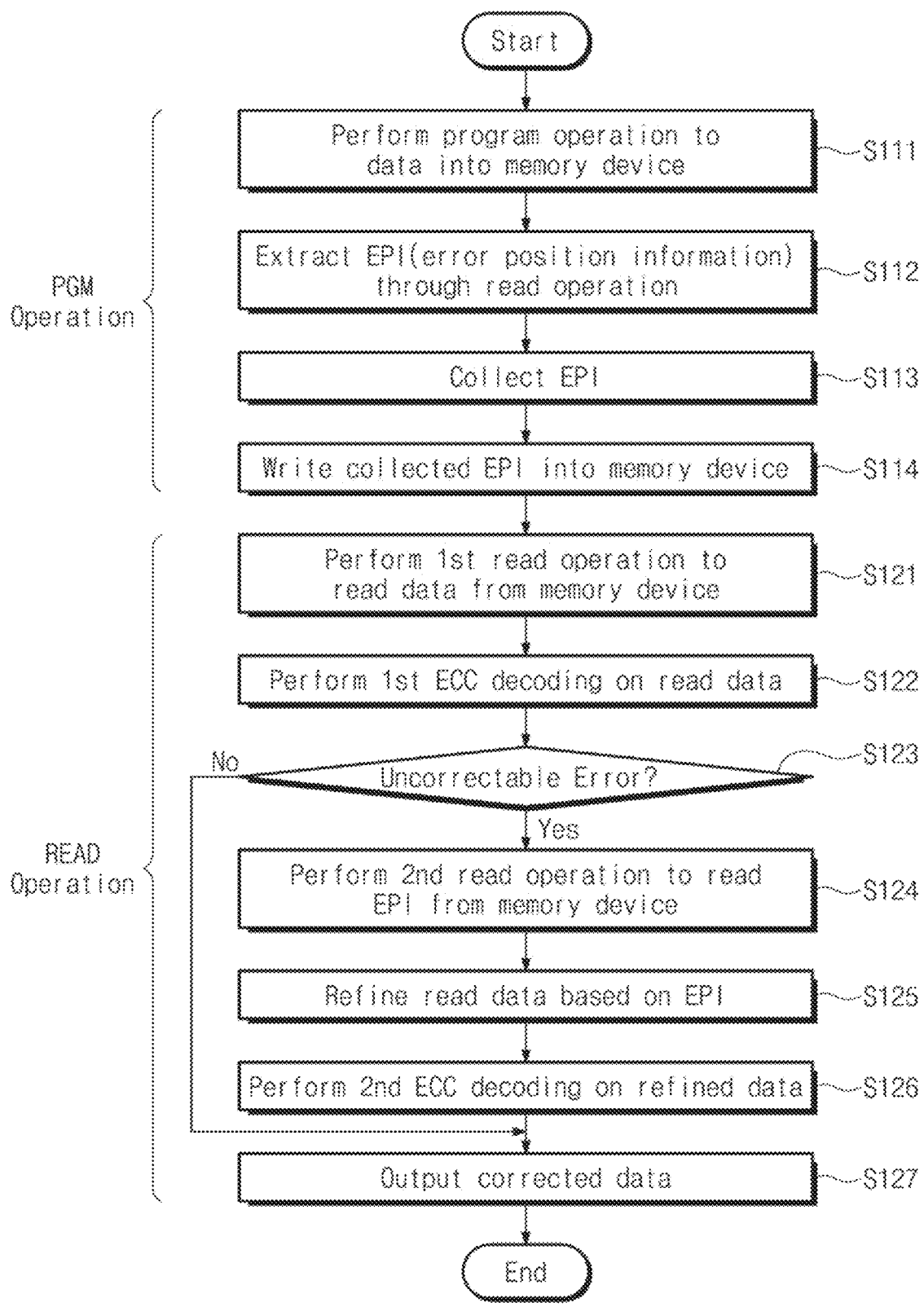
FIG. 4 is a flowchart illustrating an operation of a memory controller of FIG. 1.

FIG. 4 is a flowchart illustrating an operation of a memory controller of FIG. 1. Referring to FIGS. 1 and 3, in operation S111, the memory controller 110 may perform the program operation to store data in the memory device 120. In some example embodiments, the memory controller 110 may perform the program operation in units of page or word line. For example, the memory controller 110 may send a program command, a first address, and write data to the memory device 120. The memory device 120 may store the write data in memory cells connected with a word line corresponding to the first address in response to the program command.

In operation S112, the memory controller 110 may extract the error position information EPI through the read operation. For example, after performing the program operation in operation S111, the memory controller 110 may read the stored data from the memory device 120. In this case, the data read from the memory device 120 may include an error due to a physical characteristic of the memory device 120. The error position manager 112 of the memory controller 110 may extract the error position information EPI (e.g., information about a position of a bit string, at which the error occurs, or information about a position of a memory cell at which the error occurs) based on the error of the read data. In some example embodiments, operation S112 may be performed through at least one read operation. For example, the memory controller 110 may send a read command and the first address to the memory device 120. The memory device 120 may read data stored in memory cells connected with the word line corresponding to the first address in response to the read command and may send the read data to the memory controller 110.

In some example embodiments, operation S112, that is, the read operation or the error position information extracting operation may be performed immediately after the program operation is performed in operation S111. Alternatively, operation S112, that is, the read operation or the error position information extracting operation may be performed after a given time passes from a time at which the program operation is performed in operation S111. Alternatively, operation S112, that is, the read operation or the error position information extracting operation may be performed after the program operation of operation SIll is performed as much as a given unit (e.g., a memory block unit or a sub-block unit). Operation S112, that is, the read operation or the error position information extracting operation will be described in detail with reference to the following drawings.

In operation S113, the memory controller 110 may collect the error position information EPI. In some example embodiments, the memory controller 110 may collect the error position information EPI corresponding to data of a given unit. For example, one error position information EPI may correspond to one page data or one word line data. The memory controller 110 may collect the plurality of error position information EPI corresponding to data of a memory block unit or a sub-block unit.

In operation S114, the memory controller 110 may store the collected error position information EPI in the memory device 120. In some example embodiments, the error position information EPI may be stored in another area of the memory device 120, which is different from an area where the data (e.g., the user data) are stored. For example, the memory controller 110 may send the program command, a second address, and the collected error position information EPI to the memory device 120. The memory device 120 may store the collected error position information EPI in memory cells connected with a word line corresponding to the second address. In some example embodiments, the first address described in operation S111 and the second address described in operation S114 may be different addresses, and the word lines respectively corresponding to the first and second addresses may be different from each other.

In some example embodiments, the memory cells of memory device 120 may operate as a TLC. That is, user data that are stored in the memory device 120 may be stored in memory cells operating as a TLC. In contrast, the collected error position information EPI may be stored in memory cells operating as an SLC or an MLC. An area where the error position information EPI is stored will be described in detail with reference to the following drawings.

As described above, after storing data in the memory device 120, the memory controller 110 may extract the error position information EPI associated with the data stored in the memory device 120 and may store the extracted error position information EPI in the memory device 120.

In operation S121, the memory controller 110 may perform a first read operation to read data from the memory device 120. In operation S122, the memory controller 110 may perform first ECC decoding on the read data. In operation S123, the memory controller 110 may determine whether an uncorrectable error exists.

For example, the ECC engine 111 of the memory controller 110 may detect and correct an error of the data read from the memory device 120. When the error of the data read from the memory device 120 exceeds the error correction capacity of the ECC engine 111, the error may not be corrected. In this case, the memory controller 110 may determine that an uncorrectable error exists.

When it is determined that that an uncorrectable error exists, in operation S124, the memory controller 110 may perform a second read operation to read the error position information EPI from the memory device 120. In some example embodiments, the error position information EPI may correspond to the data read through the first read operation in operation S121. In some example embodiments, the second read operation in operation S124 may be different from the first read operation in operation S121. That is, the first and second read operations may be performed based on different addresses.

In operation S125, the memory controller 110 may refine the read data based on the error position information EPI. For example, the error position manager 112 of the memory controller 110 may determine a position of a bit string, at which an error occurs, or a position of a memory cell at which the error occurs, based on the error position information EPI. The error position manager 112 may generate the refined data by inverting a bit value corresponding to the error position information EPI from among bit values of the read data. That is, the refined data may be data including errors, the number of which is less than that of original read data.

In some example embodiments, the error position manager 112 may be configured to refine at least one of original read data, soft decision data, or hard decision data. Example embodiments associated with how to refine data will be described in detail with reference to the following drawings.

In operation S126, the memory controller 110 may perform second ECC decoding on the refined data. In operation S127, the memory controller 110 may output corrected data.

In some example embodiments, because an error level of the refined data is lower than that of the original read data, even though the first ECC decoding fails, the second ECC decoding may succeed (e.g., an error may be corrected). That is, the overall reliability of the memory system 100 may be improved.

As described above, according to some example embodiments of the present disclosure, after programming data in the memory device 120, the memory controller 110 may extract error position information associated with the programmed first data and may store the error position information in the memory device 120. Afterwards, the memory controller 110 may refine an error (or a portion of the error) of the first data read from the memory device 120 based on the error position information stored in the memory device 120 and may perform ECC decoding on the refined data, and thus, the reliability of the first data may be improved.

Figure 5:
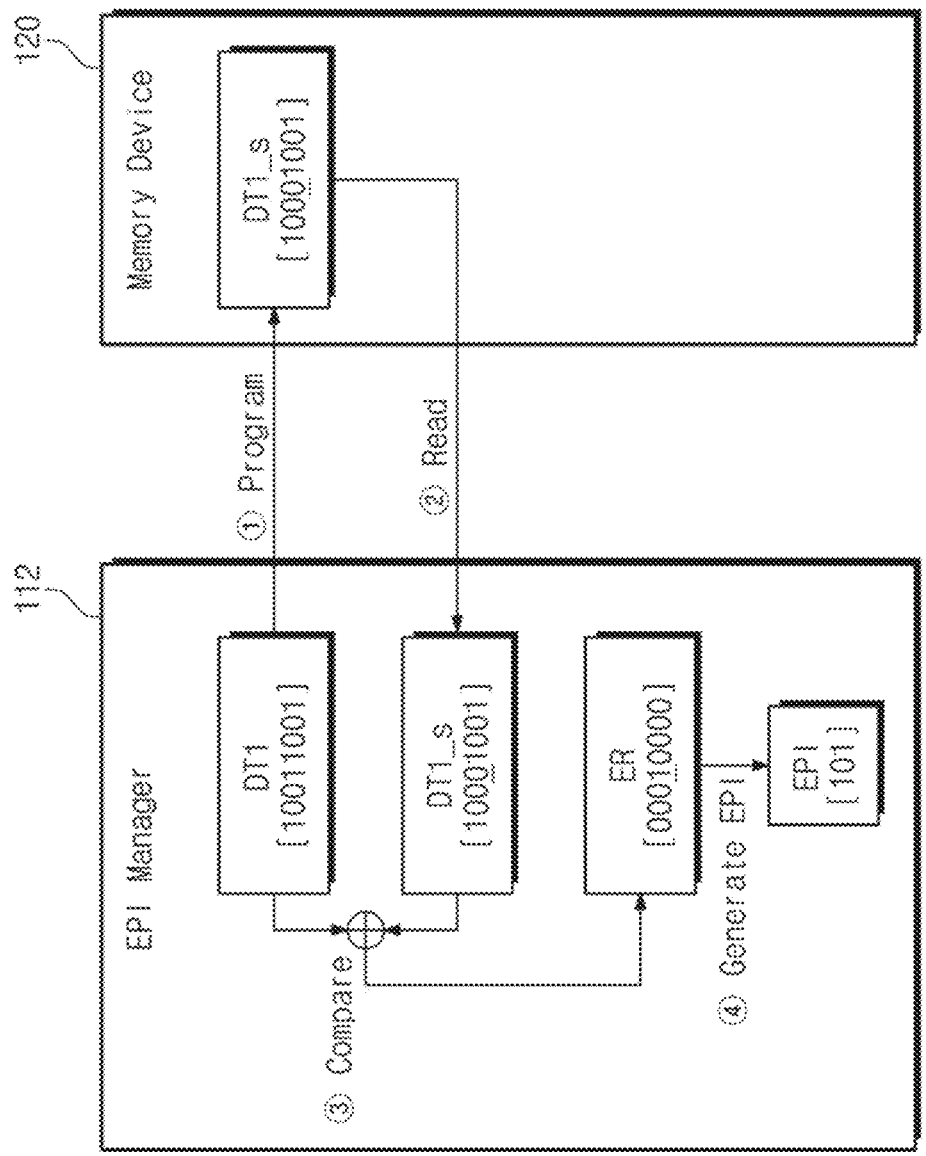
FIGS. 5 to 7 are diagrams for describing an operation of an error position manager of FIG. 1.
Figure 6:
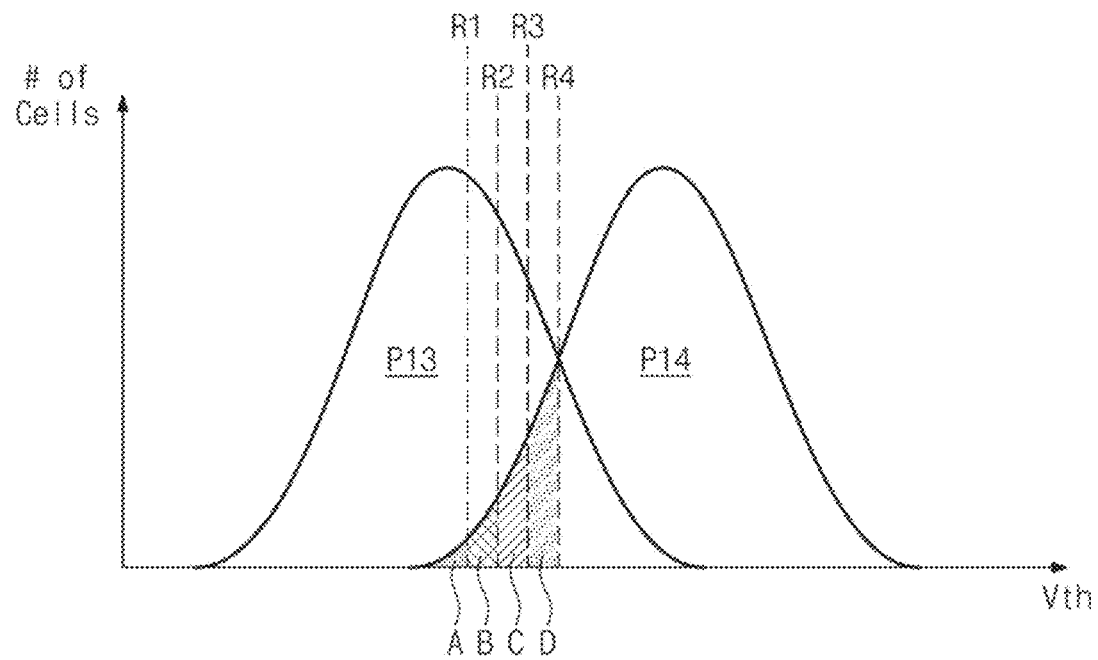
Figure 7:
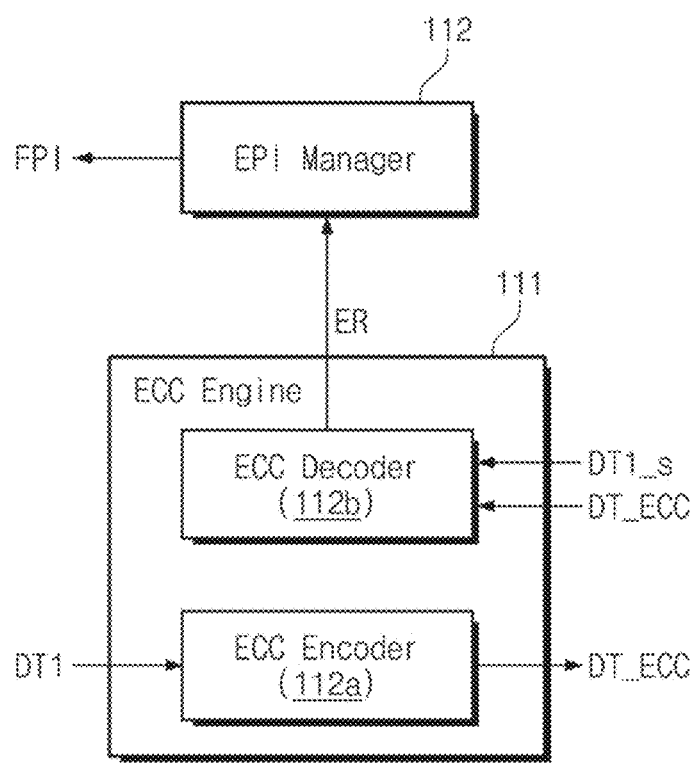

FIGS. 5 to 7 are diagrams for describing an operation of an error position manager of FIG. 1. An operation (e.g., operation S112 of FIG. 4) in which the error position information EPI is extracted will be described with reference to FIGS. 5 to 7. For brevity of drawing and convenience of description, only components necessary to extract the error position information EPI are illustrated, and the remaining components are omitted.

First, referring to FIGS. 1 and 5, the error position manager 112 of the memory controller 110 may generate the error position information EPI by comparing original data and read data. For example, the memory controller 110 may program first data DTT in the memory device 120 (operation ① of FIG. 5). In this case, the first data DTT may be a bit string of "10011001", and actual data (hereinafter referred to as "first storage data DT_s") actually stored in the memory device 120 may be a bit string of "10001001". That is, even though the first data DT1 of "10011001" are programmed in the memory device 120, the first storage data DT1_s stored in the memory device 120 may have the bit string of "10001001" (e.g., the fifth bit from the LSB being an error).

The error position manager 112 of the memory controller 110 may read the first storage data DT1_s stored in the memory device 120 (operation 2 of FIG. 5). The error position manager 112 may generate error data ER by comparing the first data DTT (e.g., the original data) and the first storage data DT1_s (e.g., the read data including an error) (operation 3 of FIG. 5). For example, in the case where the first data DTT (e.g., the original data) are "10011001" and the first storage data DT1_s (e.g., the data including an error) are "10001001", the error data ER may be "00010000", which indicates that the fifth bit value from the LSB corresponds to an error.

The error position manager 112 may generate the error position information EPI based on the error data ER. For example, in some example embodiments of FIG. 5, the generated error data ER may be "00010000", which indicates that the fifth bit value from the LSB corresponds to an error. In this case, the error position information EPI may be implemented with a binary code (e.g., "101") indicating that the fifth bit value from the LSB corresponds to an error. That is, the error position information EPI may be a value indicating a position of a bit, at which an error occurs, from among bits constituting a bit string of data; in this case, a magnitude of the error position information EPI may be different from a magnitude of the corresponding data.

In the example embodiments of illustrated by FIG. 5, 3-bit data may be required to express one error position with regard to 8-bit data. In some example embodiments, the memory controller 110 may perform the program operation and the read operation of the memory device 120 in units of page. In this case, the error position information EPI corresponding to one page may have a magnitude of 2 bytes. The numerical values described above are examples for describing some example embodiments of the present disclosure easily, and the present disclosure is not limited thereto.

Next, referring to FIGS. 1 and 6, the error position manager 112 of the memory controller 110 may generate the error position information EPI through a cell counting scheme that uses a plurality of read operations.

For example, as illustrated in FIG. 6, to distinguish the thirteenth and fourteenth program states P13 and P14, the memory controller 110 may perform a plurality of read operations by using a plurality of read voltages R1, R2, R3, and R4. Through the plurality of read operations using the plurality of read voltages R1, R2, R3, and R4, the memory controller 110 may classify memory cells of the fourteenth program state P14 into memory cells of a first area "A", memory cells of a second area "B", memory cells of a third area "C", and memory cells of a fourth area "D".

The memory cells of the first area "A" may be memory cells having a very strong error. For example, the memory cells of the first area "A" are memory cells programmed to have the fourteenth program state P14. However, because threshold voltages of the memory cells in the first area "A" are relatively lower than a value of a valley of the thirteenth and fourteenth program states P13 and P14, the probability that the memory cells of the first area "A" are determined as having the thirteenth program state P13 (e.g., the probability that the memory cells of the first area "A" are to be determined as an error) is high. As in the above description, the probability that the memory cells of the second to fourth areas "B", "C", and "D" are to be determined as an error may also be high.

In some example embodiments, in the memory cells of the first to fourth areas "A", "B", "C", and "D", which have threshold voltages lower than the value of the valley of the thirteenth and fourteenth program states P13 and P14, as a difference between threshold voltages of memory cells and the valley value increases, an error probability of the memory cells may become higher. That is, the error probability of the memory cells of the third area "C" may be higher than the error probability of the memory cells of the fourth area "D"; the error probability of the memory cells of the second area "B" may be higher than the error probability of the memory cells of the third area "C"; the error probability of the memory cells of the first area "A" may be higher than the error probability of the memory cells of the second area "B". That an error probability is high means that the probability that an error state immediately after the program operation continues to remain at an error.

As described above, the error position manager 112 of the memory controller 110 according to some example embodiments of the present disclosure may generate the error position information EPI based on memory cells belonging to the first area "A" with the highest error probability. That is, the error position information EPI may indicate a position of a bit, which is stored in a memory cell belonging to the first area "A" with the highest error probability, from among bits of a bit string of data.

For brevity of drawing and convenience of description, an error probability according to threshold voltage distributions corresponding to the thirteenth and fourteenth program states P13 and P14 is described with reference to FIG. 6, but the present disclosure is not limited thereto. For example, the error described above may occur at tails of threshold voltage distributions of other program states. The memory controller 110 may read a plurality of read data by performing a plurality of read operations based on a plurality of read voltages for each of a plurality of program states. The error position manager 112 may generate the error position information EPI according to each program state based on a plurality of read data, through a scheme similar to the above scheme.

Then, referring to FIGS. 1 and 7, the error position manager 112 of the memory controller 110 may generate the error position information EPI based on an ECC decoding result of the ECC engine 111.

For example, the ECC engine 111 may include an ECC encoder 112a and an ECC decoder 112b. The ECC encoder 112a may perform ECC encoding on the first data DT1 to be stored in the memory device 120 to generate ECC data DT_ECC. The ECC data DT_ECC may be stored in the memory device 120 together with the first data DT1. The ECC decoder 112b may perform ECC decoding based on the first storage data DT1_s and the ECC data DT_ECC read from the memory device 120. An error of the first storage data DT1_s may be detected and corrected through the ECC decoding.

In this case, the error position manager 112 may receive the error data ER about a detected error from the ECC decoder 112b of the ECC engine 111. The error position manager 112 may generate the error position information EPI based on the error data ER.

In some example embodiments, the error position information EPI is information indicating a position of an error occurred at the corresponding data or a position of a memory cell at which an error occurs. That is, it may be understood that the error position information EPI of the present disclosure is a component clearly different from ECC data or a parity bit generated by the ECC engine 111.

As described above, the error position manager 112 of the memory controller 110 may be configured to generate the error position information by extracting an error position of data stored in the memory device 120 through various schemes. In some example embodiments, the error position information EPI may be information directly indicating a position of an error occurred at data stored in the memory device 120, a position of a bit at which an error occurs, or a position of a memory cell at which an error occurs and may be a component different from ECC data or parity data for correcting an error of data.

Figure 8:
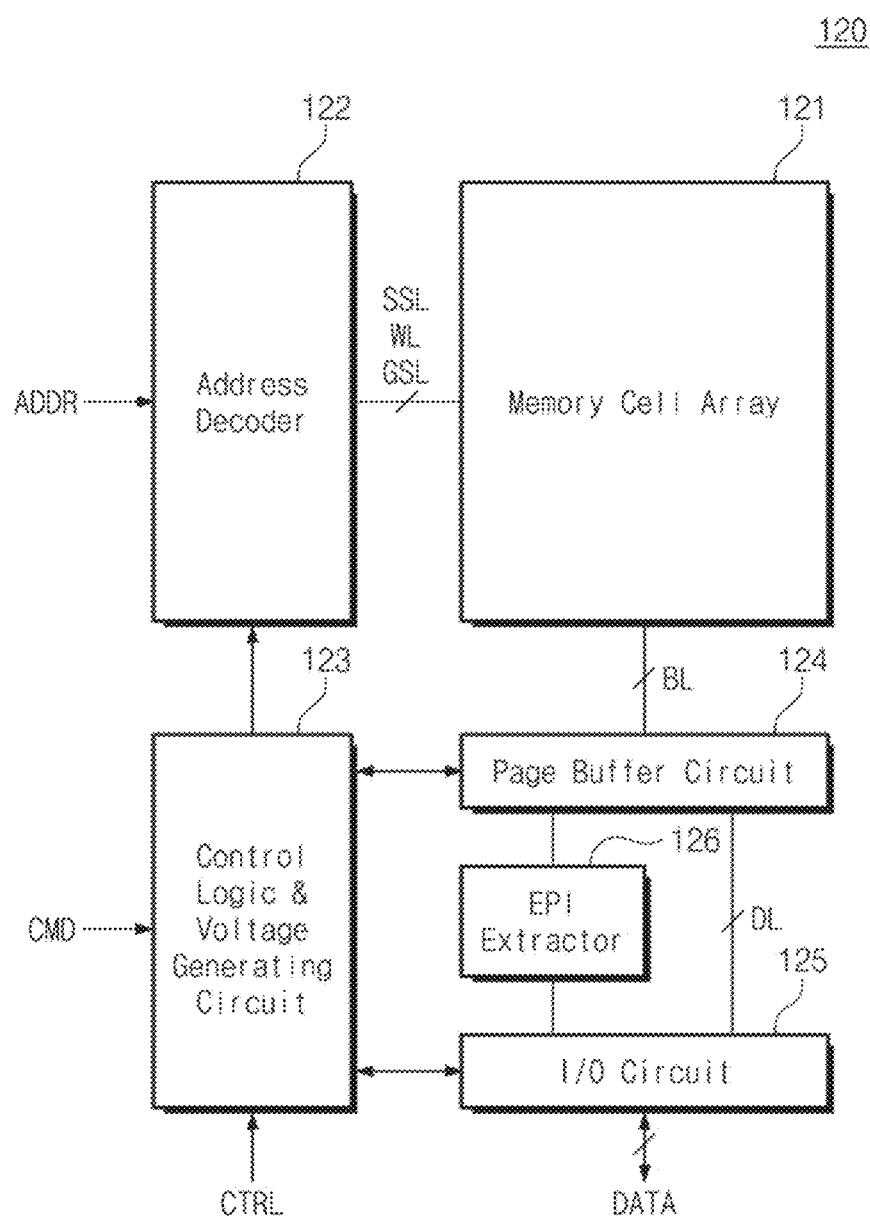
FIG. 8 is a block diagram illustrating a memory device of FIG. 1.
Figure 9:
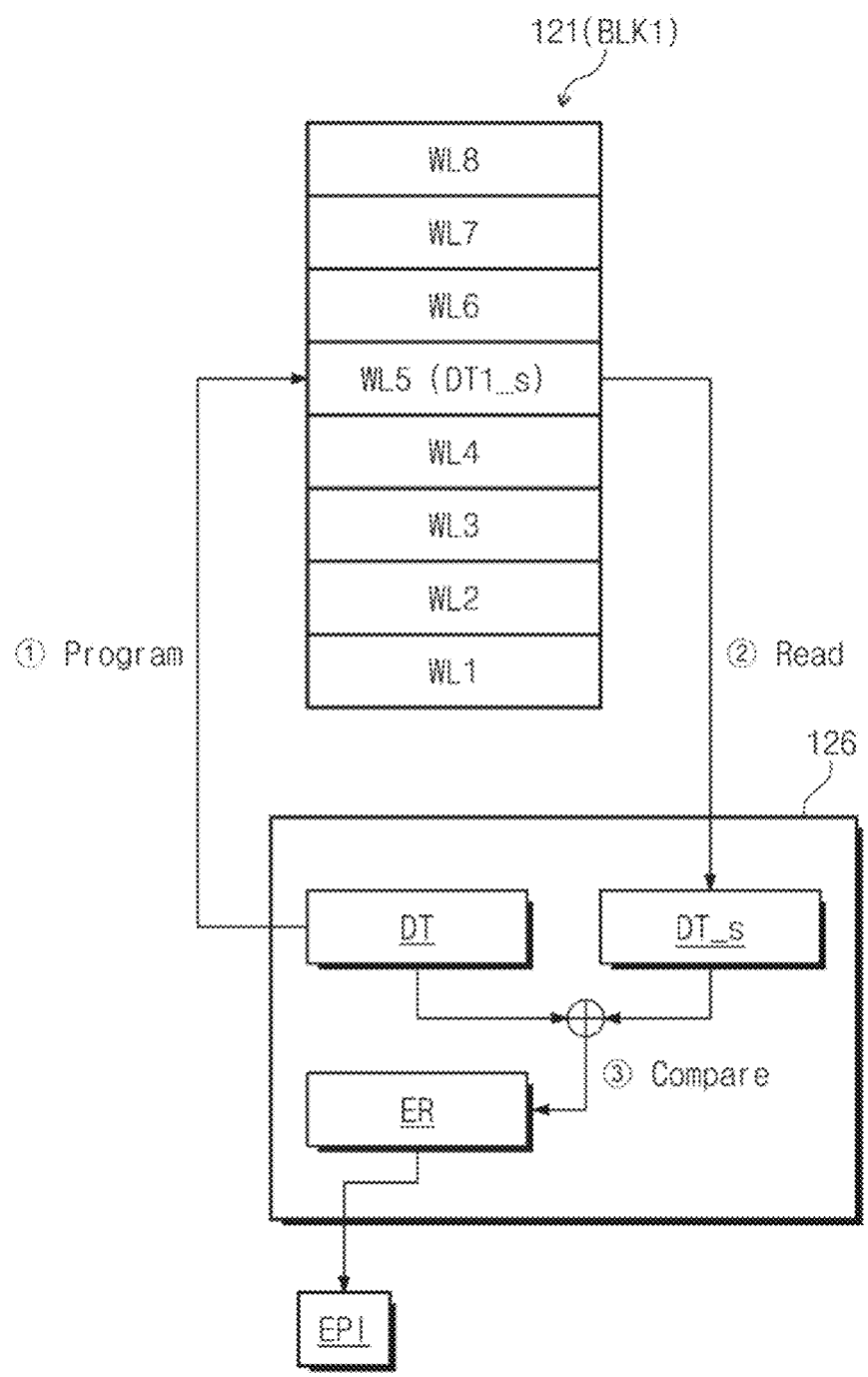
FIG. 9 is a diagram for describing an error position information extracting operation of a memory device of FIG. 8.

FIG. 8 is a block diagram illustrating a memory device of FIG. 1. FIG. 9 is a diagram for describing an error position information extracting operation of a memory device of FIG. 8. In some example embodiments described with reference to FIGS. 5 to 7, the error position information EPI may be extracted depending on the operation and control of the memory controller 110. However, the present disclosure is not limited thereto. For example, the error position information EPI may be extracted in the memory device 120, and the memory controller 110 may be configured to collect and manage the error position information EPI extracted by the memory device 120.

Referring to FIGS. 1, 8, and 9, the memory device 120 may include a memory cell array 121, an address decoder 122, a control logic and voltage generating circuit (hereinafter referred to as a "control logic circuit") 123, a page buffer circuit 124, and an input/output circuit 125.

The memory cell array 121 may include a plurality of memory blocks. Each of the plurality of memory blocks may have a structure similar to that of the first memory block BLK1 described with reference to FIG. 2.

The address decoder 122 may be connected with the memory cell array 121 through the string selection lines SSL, the word lines WL, and the ground selection lines GSL. The address decoder 122 may receive and decode an address ADDR from the memory controller 110. The address decoder 122 may control voltages of the string selection lines SSL, the word lines WL, and the ground selection lines GSL based on a decoding result.

The control logic circuit 123 may generate various operation voltages necessary for the memory device 120 to operate. For example, the various operation voltages may include a plurality of program voltages, a plurality of verification voltages, a plurality of pass voltages, a plurality of selection read voltages, a plurality of non-selection read voltages, a plurality of erase voltages, and the like. The control logic circuit 123 may receive a command CMD and a control logic CTRL from the memory controller 110 and may control the components of the memory device 120 based on the received signals.

The page buffer circuit 124 may be connected with the memory cell array 121 through the bit lines BL. The page buffer circuit 124 may temporarily store data read from the memory cell array 121 or data to be stored in the memory cell array 121. For example, the page buffer circuit 124 may read data from the memory cell array 121 through bit lines BL or may store data in the memory cell array 121 through the bit lines BL.

The input/output circuit 125 may exchange data "DATA" with the memory controller 110. The input/output circuit 125 may provide the data "DATA" received from the memory controller 110 to the page buffer circuit 124 through data lines DL or may receive the data "DATA" to be transmitted to the memory controller 110 from the page buffer circuit 124 through the data lines DL.

In some example embodiments, the memory device 120 may further include an error position information extractor 126. The error position information extractor 126 may be configured to extract the error position information EPI indicating an error position of data stored in the memory cell array 121.

For example, as illustrated in FIG. 9, under control of the memory controller 110, the memory device 120 may program the first data DT1 at a fifth word line WL5 (or in memory cells of the fifth word line WL5) of the first memory block BLK1 of the memory cell array 121 (operation 1) of FIG. 9). In this case, as described above, the first storage data DT1_s programmed at the fifth word line WL5 may include an error.

After the program operation associated with the first data DTT is completed, the memory device 120 may read the first storage data DT1_s from the fifth word line WL5 (or from the memory cells of the fifth word line WL5). The error position information extractor 126 of the memory device 120 may generate the error data ER by comparing the first storage data DT1_s and the first data DTT. The error position information extractor 126 may generate the error position information EPI based on the error data ER. The operation of the error position information extractor 126 is similar to the operation of the error position manager 112 described with reference to FIG. 5, and thus, additional description will be omitted to avoid redundancy.

As described above, after the program operation is performed for each page or word line, the memory device 120 may extract the error position information EPI by reading the programmed data and comparing the read data and the original data.

In some example embodiments of FIGS. 8 and 9, the configuration where the memory device 120 further includes the error position information extractor 126 is described, but the present disclosure is not limited thereto. For example, the memory device 120 may perform a comparison operation (e.g., an XOR operation) on the first data DTT and the first storage data DT1_s by using the page buffer circuit 124, and the error position information EPI may be extracted based on a result of the comparison operation.

In some example embodiments of FIGS. 8 and 9, the configuration where the memory device 120 extracts the error position information EPI by comparing the original data and the stored data is described, but the present disclosure is not limited thereto. For example, the memory device 120 may repeatedly perform the read operation on the first storage data DT1_s by using a plurality of read voltages. The memory device 120 may detect a position of a memory cell (e.g., a degraded memory cell) belonging to a tail area (refer to FIG. 6) of a threshold voltage distribution of each program state. The memory device 120 may generate the error position information EPI based on the position of the detected memory cell.

In some example embodiments, the error position information EPI generated by the memory device 120 may be provided to the memory controller 110 through various schemes. For example, the memory device 120 may perform the program operation in response to a program command received from the memory controller 110. After the program operation is completed, the memory controller 110 may check whether the program operation of the memory device 120 is completed, through a status read operation. In some example embodiments, the error position information EPI may be provided from the memory device 120 to the memory controller 110 through the status read operation for checking whether the program operation of the memory device 120 is completed. Alternatively, the memory device 120 may generate the error position information EPI in response to an explicit request (or a separate command) of the memory controller 110 and may provide the error position information EPI to the memory controller 110.

As described above, the error position information EPI may be generated by the memory controller 110 or the memory device 120. The above operation of extracting the error position information EPI is an example for describing example embodiments of the present disclosure easily, and the present disclosure is not limited thereto.

FIGS. 10A to 10D are diagrams for describing an error position extracting time point according to some example embodiments of the present disclosure. In some example embodiments, the error position information EPI may indicate an error position of data programmed in the memory device 120 or a position of a memory cell corresponding to an error. The error position information EPI may be extracted immediately after data are programmed, after a given time passes from a point in time when the data are programmed, or after the program operation is performed as much as a specific unit.

In some example embodiments, the point in time when the data are programmed may be recognized through status information read from the memory device 120. For example, the memory controller 110 may transmit a program command, an address, and data to the memory device 120 for the purpose of programming the data in the memory device 120, and the memory device 120 may perform the program operation in response to the program command. When the program operation of the memory device 120 is completed, the memory controller 110 may transmit a status read command to the memory device 120, and the memory device 120 may transmit, as status information, information about whether the program operation is completed. Through the status read operation described above, the memory controller 110 may check whether the program operation of the memory device 120 is completed.

Below, to easily describe a point in time when the error position information EPI is extracted, it is assumed that the memory controller 110 programs data in the memory device 120 and extracts the error position information EPI from the memory device 120. However, the present disclosure is not limited thereto. For example, the operation of extracting the error position information EPI may be automatically performed in the memory device 120 or may be performed in the memory device 120 under control of the memory controller 110. Below, the error position information extracting operation may be performed based on at least one of the operation methods described with reference to FIGS. 1 to 9.

For example, referring to FIGS. 1, 2, 10A, 10B, 10C, and 10D, the memory device 120 may perform the program operation in units of word line, under control of the memory controller 110. For example, under control of the memory controller 110, the memory device 120 may sequentially perform the program operation on the first to eighth word lines WL1 to WL8 of the first memory block BLK1. In this case, the memory device 120 may perform the program operation in the order from uppermost to lowermost word lines (e.g., WL8→WL7→WL6→WL5→WL4→WL3→WL2→WL1). In some example embodiments, a programming sequence of word lines may be controlled by the memory controller 110 based on a physical characteristic of the memory device 120, and it may be understood that the present disclosure is not limited to the illustrated programming sequence.

Figure 10A:
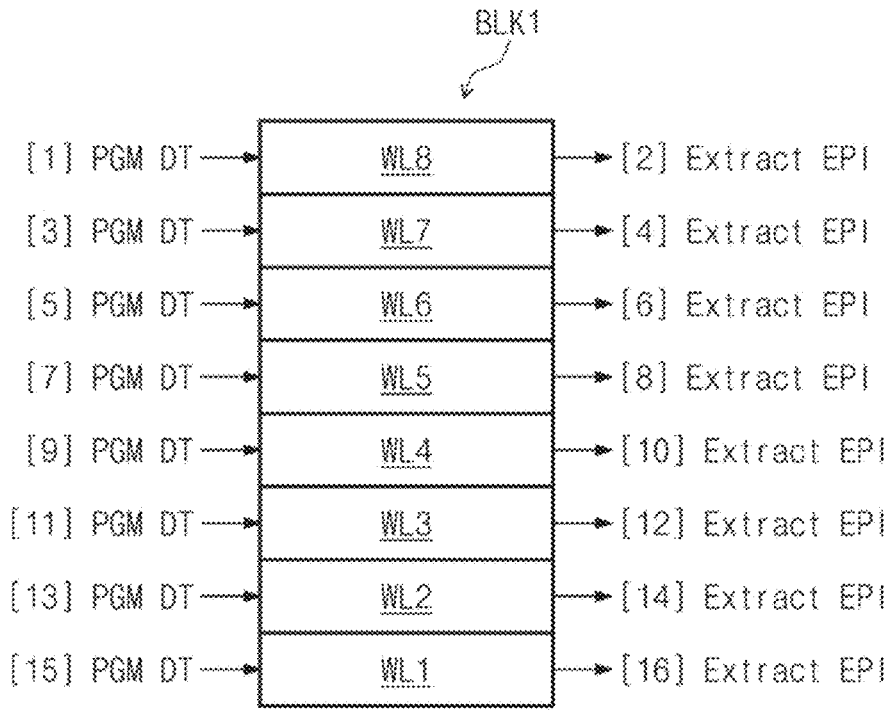
FIGS. 10A to 10D are diagrams for describing an error position extracting time point according to some example embodiments of the present disclosure.

First, the memory controller 110 may repeatedly perform the program operation and the error position information extracting operation in units of word line. For example, as illustrated in FIG. 10A, the memory controller 110 may perform the program operation (refer to operation [1] of FIG. 10A) on the eighth word line WL8 of the first memory block BLK1. Afterwards, the memory controller 110 may perform the error position information extracting operation (refer to operation [2] of FIG. 10A) on the eighth word line WL8 of the first memory block BLK1. Next, the memory controller 110 may perform the program operation (refer to operation [3] of FIG. 10A) on the seventh word line WL7. Afterwards, the memory controller 110 may perform the error position information extracting operation (refer to operation [4] of FIG. 10A) on the seventh word line WL7.

Likewise, the memory controller 110 may perform a pair of program operation and error position information extracting operation (hereinafter referred to as an operation pair ([x], [y])) on each of the sixth to first word lines WL6 to WL1, that is, an operation pair ([5], [6]), an operation pair ([7], [8]), an operation pair ([9], [10]), an operation pair ([11], [12]), an operation pair ([13], [14]), and an operation pair ([15], [16]) may be sequentially performed on the sixth to first word lines WL6 to WL1. That is, when the memory controller 110 performs the program operation and the error position information extracting operation in units of word line, the memory controller 110 may perform the error position information extracting operation on a target word line immediately after the program operation is performed on the target word line.

Figure 10B:
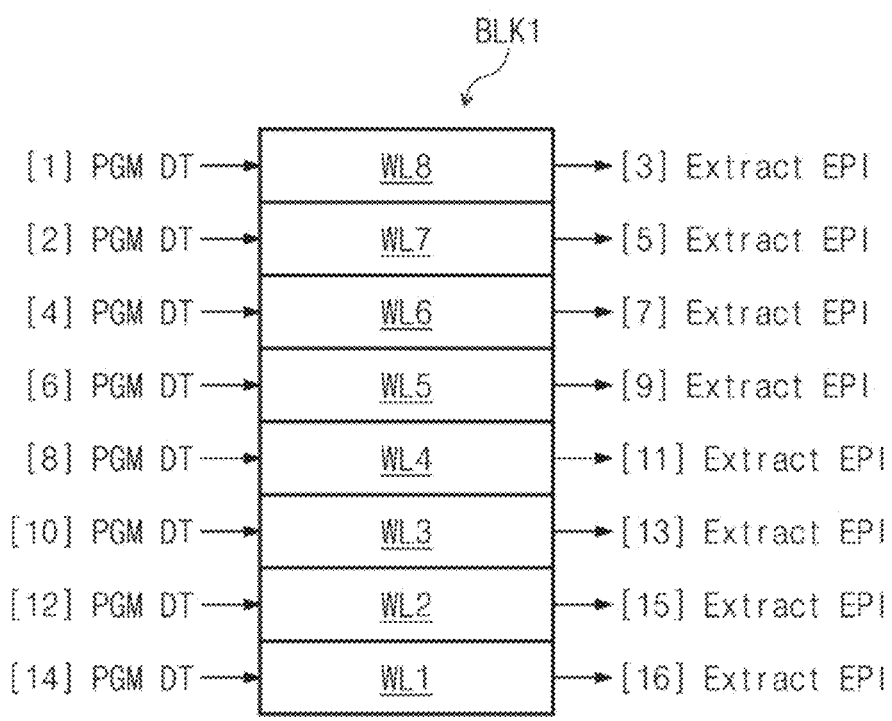

Alternatively, when the memory controller 110 repeatedly performs the program operation and the error position information extracting operation in units of word line, the memory controller 110 may perform the error position information extracting operation on a target word line after the program operation is performed on an adjacent word line of the target word line. For example, as illustrated in FIG. 10B, the memory controller 110 may perform the program operation (refer to operation [1] of FIG. 10B) on the eighth word line WL8. Next, the memory controller 110 may perform the program operation (refer to operation [2] of FIG. 10B) on the seventh word line WL7. Then, the memory controller 110 may perform the error position information extracting operation (refer to operation [3] of FIG. 10B) on the eighth word line WL8. Afterwards, the memory controller 110 may perform the program operation (refer to operation [4] of FIG. 10B) on the sixth word line WL6. Afterwards, the memory controller 110 may perform the error position information extracting operation (refer to operation [5] of FIG. 10B) on the seventh word line WL7. Likewise, with regard to each of the fifth to first word lines WL5 to WL1, the memory controller 110 may perform the program operation (refer to operation [6], [8], [10], [12], or [14] of FIG. 10B), and may perform the error position information extracting operation (refer to operation [7], [9], [11], [13], [15], or [16] of FIG. 10B) after the program operation on an adjacent word line is completed.

As described above, when the memory controller 110 may alternately perform the program operation and the error position information extracting operation in units of word line, the error position information extracting operation may be performed at various points in time: immediately after the program operation is completed, after a given time passes from a point in time when the program operation is completed, and after the program operation of an adjacent word line is completed.

Figure 10C:
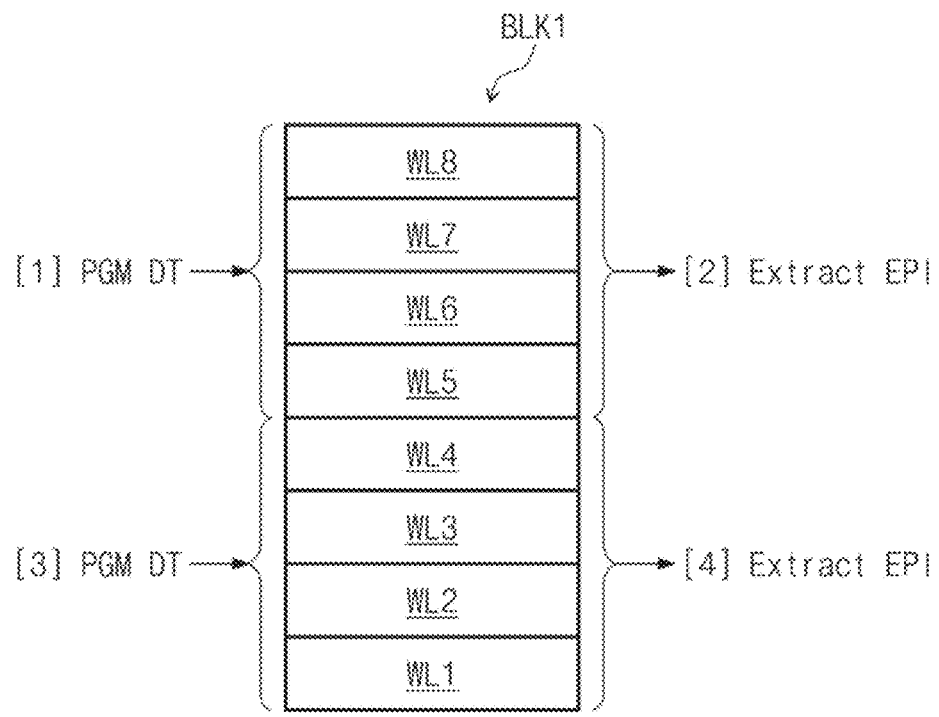

Alternatively, the memory controller 110 may perform the error position information extracting operation after the program operation is performed as much as a given unit. For example, as illustrated in FIG. 10C, the memory controller 110 may perform the program operation (refer to operation [1] of FIG. 10C) on the eighth to fifth word lines WL8 to WL5 of the first memory block BLK1. In some example embodiments, the memory controller 110 may perform the program operation on the eighth to fifth word lines WL8 to WL5 in units of page or word line. Next, the memory controller 110 may perform the error position information extracting operation (refer to operation [2] of FIG. 10C) on the eighth to fifth word lines WL8 to WL5. In some example embodiments, the memory controller 110 may perform the error position information extracting operation on the eighth to fifth word lines WL8 to WL5 in units of page or word line. Likewise, the memory controller 110 may perform the program operation (refer to operation [3] of FIG. 10C) on the fourth to first word lines WL4 to WL1 and may then perform the error position information extracting operation (refer to operation [4] of FIG. 10C) on the fourth to first word lines WL4 to WL1.

In some example embodiments, a word line zone or sub-block in which the eighth to fifth word lines WL8 to WL5 are included may be different from a word line zone or sub-block in which the fourth to first word lines WL4 to WL1 are included. That is, the memory controller 110 may repeatedly perform the program operation and the error position information extracting operation in units of word line zone, sub-block, or word lines, the number of which is determined in advance.

Figure 10D:
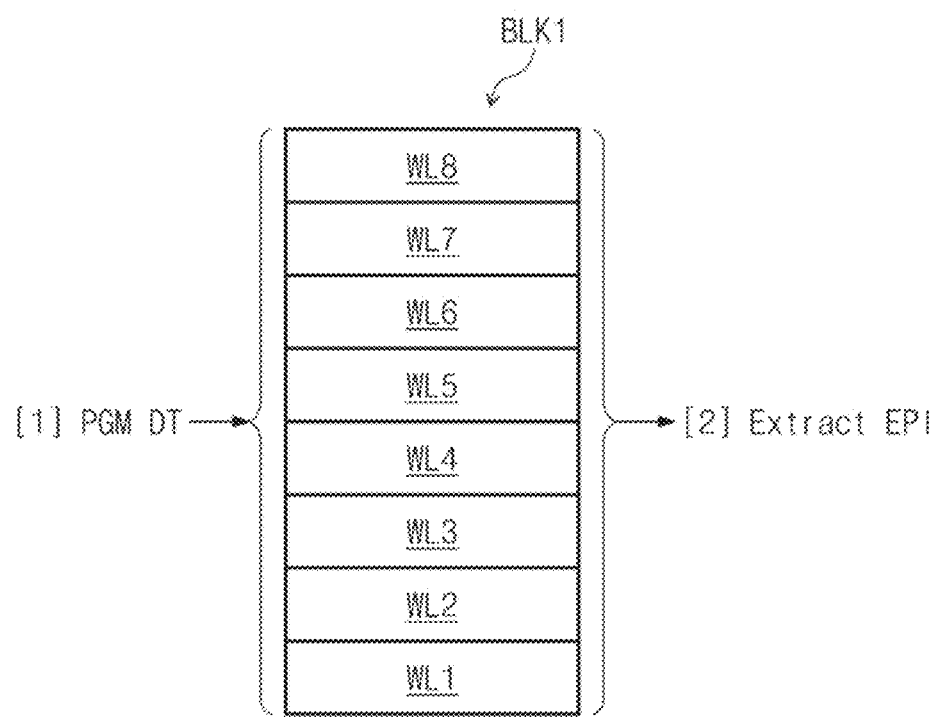

Alternatively, the memory controller 110 may perform the error position information extracting operation after the program operation is performed in units of memory block. For example, as illustrated in FIG. 10D, the memory controller 110 may perform the program operation (refer to operation [1] of FIG. 10D) on the first memory block BLK1. In some example embodiments, the program operation associated with the first memory block BLK1 may be performed in units of word line. Afterwards, the memory controller 110 may perform the error position information extracting operation (refer to operation [2] of FIG. 10D) on the first memory block BLK1. In some example embodiments, the error position information extracting operation associated with the first memory block BLK1 may be performed in units of word line.

FIGS. 11A to 11D are diagrams for describing an operation in which error position information is programmed in a memory device. For brevity of drawing and convenience of description, components that are unnecessary to program the error position information EPI in the memory device 120 are omitted.

Below, for convenience of description, the description will be given as the error position information EPI is extracted in units of memory block, but the present disclosure is not limited thereto. For example, the error position information EPI may be extracted at various points in time in units of word line or page, like some example embodiments described with reference to FIGS. 10A to 10D.

As described with reference to FIGS. 10A to 10D, the memory controller 110 may extract the error position information EPI associated with data stored in the memory device 120 at various operating points in time. In some example embodiments, the extracted error position information EPI may be collected by a given unit. For example, one page data that are stored in the memory device 120 may be 8 KB. 2-Byte information may be required to express a position of one error that occurs at 8 KB data. A page (e.g., a page of an 8 KB size) may include the error position information EPI associated with 4K errors, and the error position information EPI associated with 4K errors may be programmed in the memory device 120 through one program operation. That is, the memory controller 110 may collect the error position information EPI associated with a plurality of errors included in a plurality of pages or a plurality of word lines as much as a given size and may program the collected error position information EPI in the memory device 120.

In detail, as illustrated in FIG. 11A, the memory controller 110 may perform the program operation on the eighth to first word lines WL8 to WL1 of the first memory block BLK1 and may perform the error position information extracting operation. The error position information EPI associated with the first memory block BLK1 may be collected by the memory controller 110. The collected error position information EPI may be programmed at the first dummy word line DWL1 or the second dummy word line DWL2 of the first memory block BLK1.

In some example embodiments, as described with reference to FIG. 2, the first memory block BLK1 may include the first and second dummy memory cells DMC1 and DMC2 connected with the first and second dummy word lines DWL1 and DWL2. In some example embodiments, the first and second dummy memory cells DMC1 and DMC2 may be memory cells that are not used to store user data and may be provided for the reliability of the first memory block BLK1. According to some example embodiments of the present disclosure, the error position information EPI may be programmed in the first and second dummy memory cells DMC1 and DMC2.

Figure 11B:
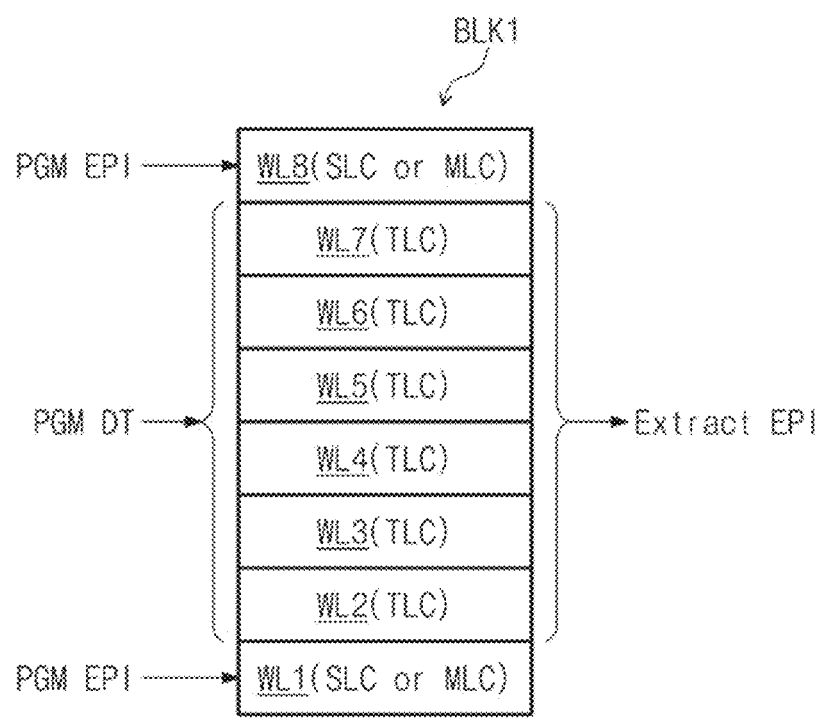

Alternatively, as illustrated in FIG. 11B, the memory controller 110 may program the error position information EPI at edge word lines (e.g., the eighth and first word lines WL8 and WL1) of the first memory block BLK1. In some example embodiments, the eighth word line WL8, which is physically the closest to the bit line BL, from among the word lines WL1 to WL8 included in the first memory block BLK1 may be the uppermost word line, and the first word line WL1, which is physically the closest to the common source line CSL, from among the word lines WL1 to WL8 may be the lowermost word line. To improve the reliability of data stored in the first memory block BLK1, each of memory cells connected with the uppermost and lowermost word lines may be configured to store a relatively smaller number of bits depending on a physical characteristic of the first memory block BLK1. For example, the memory cells included in the first memory block BLK1 may operate as a TLC. In this case, memory cells connected with the uppermost and lowermost word lines from among the memory cells of the first memory block BLK1 may operate as an SLC or an MLC.

In this case, the memory controller 110 may program user data at the seventh to second word lines WL7 to WL2 of the first memory block BLK1 and may program the error position information EPI at the eighth word line WL8 or the first word line WL1.

That is, as described above, the memory controller 110 may program the error position information EPI of a specific memory block at dummy word lines of the specific memory block or at the uppermost and lowermost word lines of the specific memory block. In some example embodiments, the number of bits stored in each of memory cells in which the error position information EPI is programmed may be less than the number of bits stored in each of memory cells in which the user data are programmed.

Figure 11C:
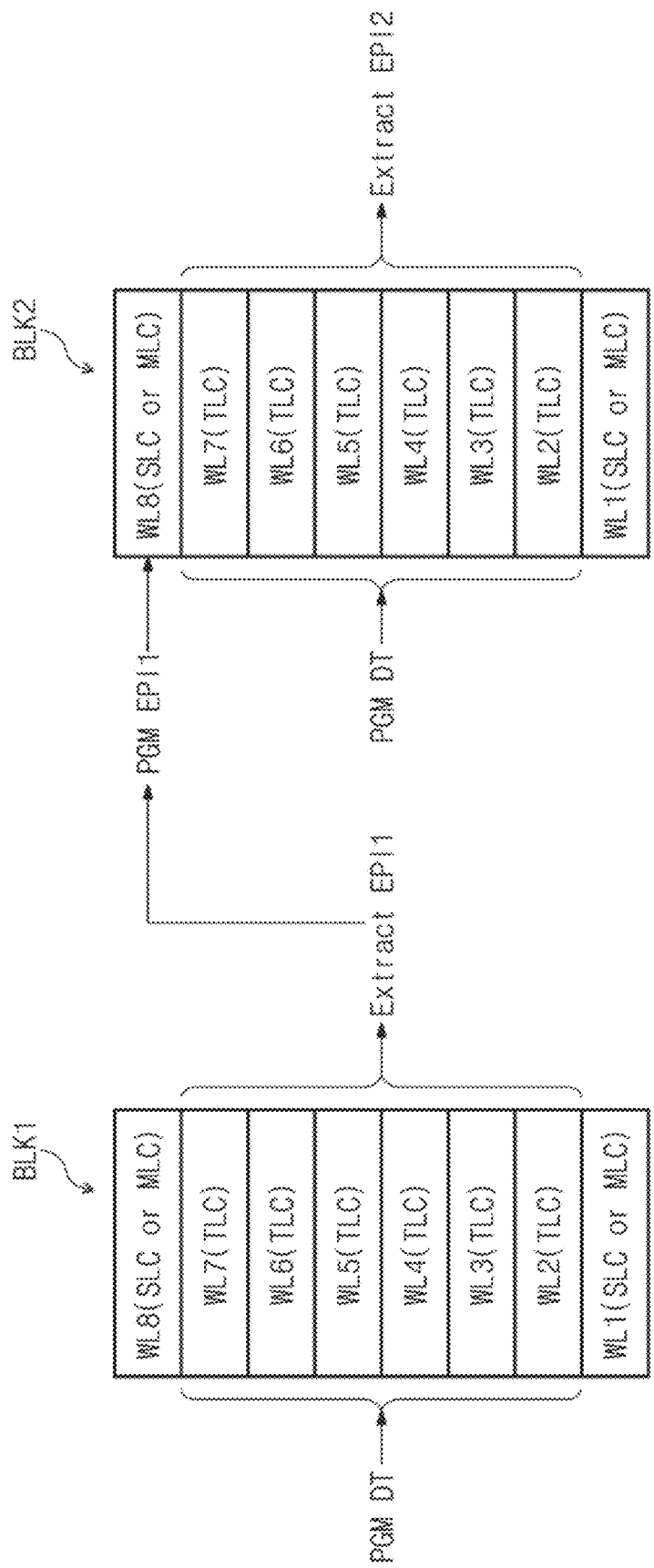

Alternatively, as illustrated in FIG. 11C, the memory controller 110 may program first error position information EPI1 of the first memory block BLK1 at the uppermost word line WL8 of a second memory block BLK2 different from the first memory block BLK1. In some example embodiments, the second memory block BLK2 may be a memory block that is allocated following the first memory block BLK1. Although not illustrated in FIG. 1C, second error position information EPI2 of the second memory block BLK2 may be programmed at the uppermost word line of any other memory block that is allocated following the second memory block BLK2. In some example embodiments, the uppermost word line of FIG. 1C may be replaced with the lowermost word line (e.g., WL1) or a dummy word line.

Alternatively, as illustrated in FIG. 11D, the memory controller 110 may extract and collect first, second, and third error position information EPI1, EPI2, and EPI3 of the first, second, and third memory blocks BLK1, BLK2, and BLK3. The memory controller 110 may program the first, second, and third error position information EPI1, EPI2, and EPI3 at a separate memory block BLKa. In some example embodiments, memory cells of the first, second, and third memory blocks BLK1, BLK2, and BLK3 may operate as a TLC, and memory cells of the separate memory block BLKa may operate as an SLC.

As described with reference to FIGS. 11A to 11D, the memory controller 110 may collect a plurality of error position information EPI and may program the plurality of error position information EPI thus collected at a specific area of the memory device 120. In this case, one error position information EPI may be information indicating a position of an error that occurs at data of a page unit or a given size. That is, the size of one error position information EPI may be smaller than the size of one page. The plurality of error position information EPI may have the same size as one page or may have the same size as a program unit of the memory device 120.

In some example embodiments, the memory controller 110 may compress the plurality of error position information EPI and may program the compressed data in the memory device 120. In this case, the amount of error position information EPI that is stored in the memory device 120 by using the same number of memory cells may increase. Alternatively, through the ECC encoder 112a of the ECC engine 111, the memory controller 110 may compress the error position information EPI by generating a syndrome associated with the error position information EPI.

Figure 12:
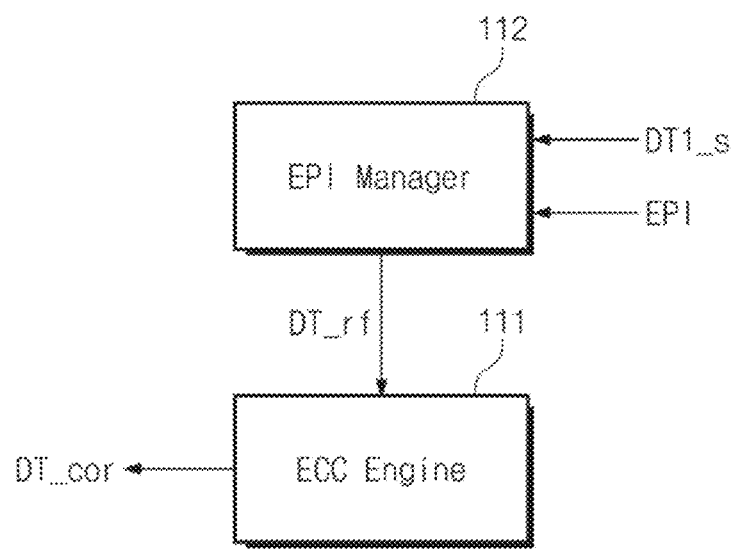
FIG. 12 is a diagram for describing a read operation of FIG. 4.

FIG. 12 is a diagram for describing a read operation of FIG. 4. In some example embodiments, the memory controller 110 may store, in the memory device 120, the error position information EPI about data stored in the memory device 120, based on some example embodiments described above. The memory controller 110 may perform the read operation or the ECC decoding operation by using the error position information EPI.

For example, as illustrated in FIG. 12, the memory controller 110 may read the first storage data DT1_s and the error position information EPI from the memory device 120. In some example embodiments, a first read operation for reading the first storage data DT1_s and a second read operation for reading the error position information EPI may be different from each other. For example, the memory controller 110 may read the first storage data DT1_s from the memory device 120 by transmitting a first address and the read command to the memory device 120 and may read the error position information EPI from the memory device 120 by transmitting a second address and the read command to the memory device 120.

The error position manager 112 of the memory controller 110 may generate refined data DT_rf based on the first storage data DT1_s and the error position information EPI. For example, as described above, the error position information EPI may indicate a position of an error included in the first storage data DT1_s. That is, the error position manager 112 may recognize an error position of the first storage data DT1_s based on the error position information EPI, and may generate the refined data DT_rf by inverting a bit value corresponding to the error position information EPI (e.g., 0→1 or 1→0). In some example embodiments, the refined data DT_rf may include a relatively small number of errors compared to the first storage data DT1_s. The ECC engine 111 of the memory controller 110 may perform ECC decoding based on the refined data DT_rf and may generate corrected data DT_cor.

In some example embodiments, in the case where the ECC engine 111 of the memory controller 110 fails to correct an error of the first storage data DT1_s through the ECC decoding operation associated with the first storage data DT1_s, the error correction operation described with reference to FIG. 12 may be performed. That is, as a part of errors of the first storage data DT1_s is refined based on the error position information EPI, an error included in the refined data DT_rf may be corrected by the ECC engine 111. Accordingly, the reliability of a memory system is improved.

In some example embodiments, the ECC engine 111 may correct an error by using a coded modulation such as a soft decoding, a low density parity check (LDPC) code, a Bose, Chaudhuri, Hocque-nghem (BCH) code, a turbo code, a Reed-Solomon code, a convolution code, a recursive systematic code (RSC), a trellis-coded modulation (TCM), or a block coded modulation (BCM), or various other schemes.

Figure 13:
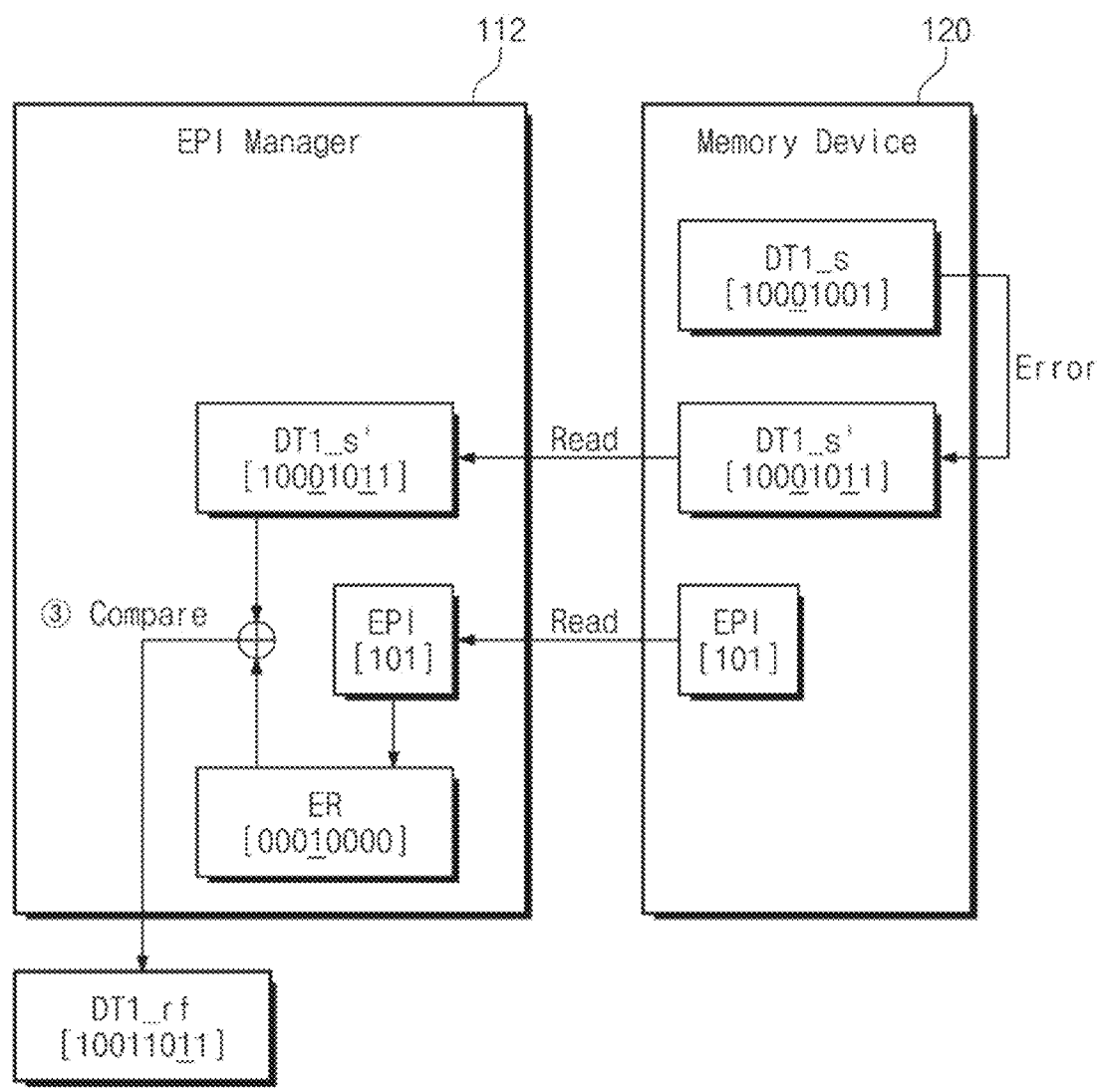
FIGS. 13 and 14 are diagrams for describing an operation of generating refined data.
Figure 14:
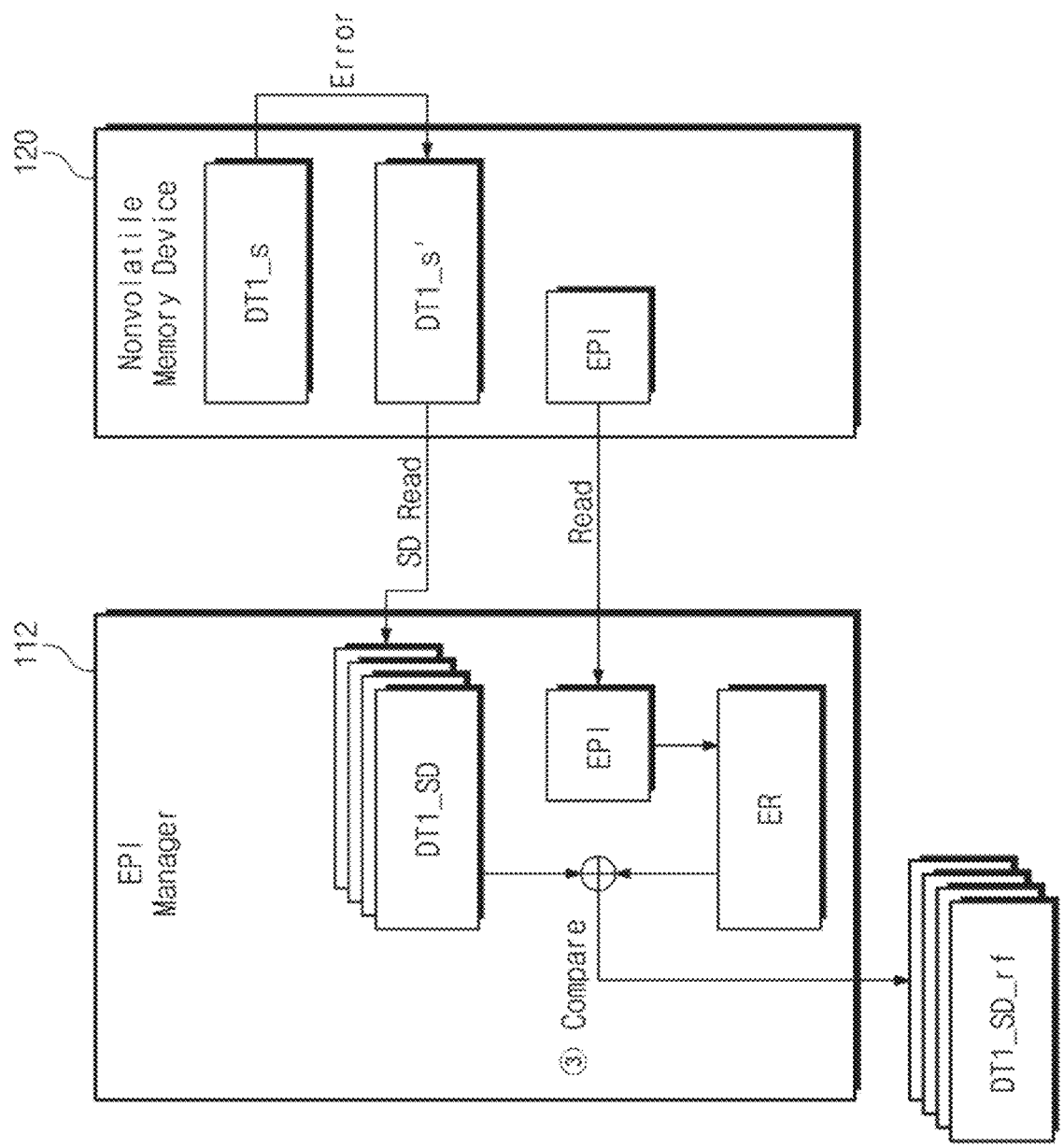

FIGS. 13 and 14 are diagrams for describing an operation of generating refined data. For brevity of drawing and convenience of description, components that are unnecessary for the error position manager 112 of the memory controller 110 to generate the refined data DT_rf are omitted. However, the present disclosure is not limited thereto. For example, an operation of generating the refined data DT_rf, which will be described with reference to FIGS. 13 and 14, may be performed after first ECC decoding performed by the memory controller 110 fails.

In some example embodiments, the refined data DT_rf may be generated by inverting a bit corresponding to the error position information EPI from among bits of the following data: hard decision data, soft decision data, or target data read from the memory device 120.

Referring to FIGS. 1, 13, and 14, an error may additionally occur at the first storage data DT1_s stored in the memory device 120 due to various factors. In this case, first storage data DT1_s' including an additional error may be maintained in the memory device 120. For example, original data stored in the memory device 120 may have a bit string of "10011001". The first storage data DT1_s actually stored in the memory device 120 may have a bit string of "10001001". In this case, the fifth bit from the LSB may be an error, and the error position information EPI may have a value of "101" indicating the fifth position from the LSB. After the first storage data DT1_s are stored, an error may occur at the second bit from the LSB due to various factors. In this case, the first storage data DT_s' including an additional error may have a bit string of "10001011".

In some example embodiments, the memory controller 110 may correct a part of errors of hard decision data or target data read from the memory device 120, based on the error position information EPI.

For example, as illustrated in FIG. 13, the memory controller 110 may read the first storage data DT1_s' from the memory device 120. The memory controller 110 may read the error position information EPI corresponding to the first storage data DT1_s' from the memory device 120. In some example embodiments, a read operation for reading the first storage data DT1_s' and a read operation for reading the error position information EPI may be different from each other.

The error position manager 112 of the memory controller 110 may generate the error data ER based on the error position information EPI. The error data ER may have a bit string of "00010000" indicating that the fifth bit from the LSB is an error. The error position manager 112 may generate refined first data DT1_rf by comparing (e.g., performing an exclusive OR operation on) the first storage data DT1_s' and the error data ER. In this case, the refined first data DT1_rf may have a bit string of "10011011". That is, in the case of the refined first data DT1_rf, an error of a position corresponding to the error position information EPI may be corrected compared to the original data.

In some example embodiments, in the case of the refined first data DT1_rf, an error may be corrected through the ECC decoding operation of the ECC engine 111 in the memory controller 110. For example, it is assumed that the ECC engine 111 is capable of correcting a 1-bit error. In this case, because the first storage data DT1_s' includes a 2-bit error, an error of the first storage data DT1_s' may not be corrected by the ECC engine 111. In contrast, because the refined first data DT1_rf includes a 1-bit error, an error of the refined first data DT1_rf may be corrected by the ECC engine 111. That is, the memory controller 110 may generate refined data by correcting a part of errors of data read from the memory device 120 based on the error position information EPI corresponding to the read data and may perform ECC decoding based on the refined data, and thus, the reliability of data may be guaranteed.

In some example embodiments, the memory controller 110 may change a value of at least one of bits of soft decision data read from the memory device 120, based on the error position information EPI. For example, as illustrated in FIG. 14, through a soft decision read operation, the memory controller 110 may read a plurality of soft decision data DT1_SD associated with the first storage data DT1_s' from the memory device 120. In some example embodiments, the soft decision read operation may include repeatedly performing the read operation on the same word line or the same page by using a plurality of read voltages such that a plurality of soft decision data DT1_SD are generated.

The memory controller 110 may read the error position information EPI from the memory device 120. The error position manager 112 of the memory controller 110 may generate the error data ER based on the error position information EPI. The error position manager 112 may refine at least one of the plurality of soft decision data DT1_SD based on the error data ER and may generate refined soft decision data DT1_SD_rf. The refined soft decision data DT1_SD_rf may be provided to the ECC engine 111, and the ECC engine 111 may perform soft decision decoding based on the refined soft decision data DT1_SD_rf.

Figure 15:
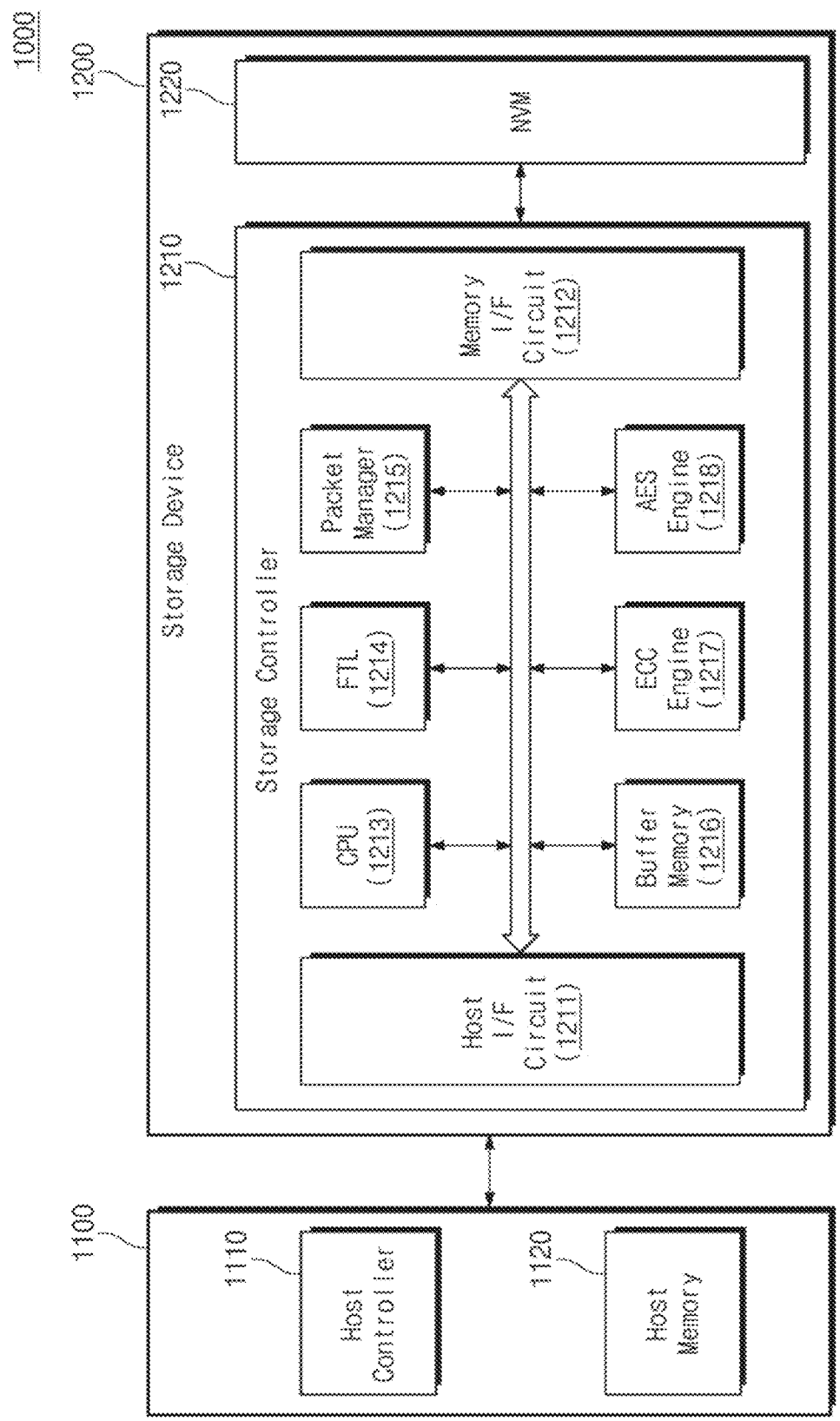
FIG. 15 is a diagram illustrating a system to which a memory system according to some example embodiments of the present disclosure is applied.

FIG. 15 is a block diagram of a host storage system 1000 according to an example embodiment. Referring to FIG. 15, the host storage system 1000 may include a host 1100 and a storage device 1200. Further, the storage device 1200 may include a storage controller 1210 and an NVM 1220. According to an example embodiment, the host 1100 may include a host controller 1110 and a host memory 1120. The host memory 1120 may serve as a buffer memory configured to temporarily store data to be transmitted to the storage device 1200 or data received from the storage device 1200.

The storage device 1200 may include storage media configured to store data in response to requests from the host 1100. As an example, the storage device 1200 may include at least one of an SSD, an embedded memory, and a removable external memory. When the storage device 1200 is an SSD, the storage device 1200 may be a device that conforms to an NVMe standard. When the storage device 1200 is an embedded memory or an external memory, the storage device 1200 may be a device that conforms to a UFS standard or an eMMC standard. Each of the host 1100 and the storage device 1200 may generate a packet according to an adopted standard protocol and transmit the packet.

When the NVM 1220 of the storage device 1200 includes a flash memory, the flash memory may include a 12D NAND memory array or a 3D (or vertical) NAND (VNAND) memory array. As another example, the storage device 1200 may include various other kinds of NVMs. For example, the storage device 1200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 1110 and the host memory 1120 may be implemented as separate semiconductor chips. Alternatively, in some embodiments, the host controller 1110 and the host memory 1120 may be integrated in the same semiconductor chip. As an example, the host controller 1110 may be any one of a plurality of modules included in an application processor (AP). The AP may be implemented as a System on Chip (SoC). Further, the host memory 1120 may be an embedded memory included in the AP or an NVM or memory module located outside the AP.

The host controller 1110 may manage an operation of storing data (e.g., write data) of a buffer region of the host memory 1120 in the NVM 1220 or an operation of storing data (e.g., read data) of the NVM 1220 in the buffer region.

The storage controller 1210 may include a host interface 1211, a memory interface 1212, and a CPU 1213. Further, the storage controllers 1210 may further include a flash translation layer (FTL) 1214, a packet manager 1215, a buffer memory 1216, an error correction code (ECC) engine 1217, and an advanced encryption standard (AES) engine 1218. The storage controllers 1210 may further include a working memory (not shown) in which the FTL 1214 is loaded. The CPU 1213 may execute the FTL 1214 to control data write and read operations on the NVM 1220.

The host interface 1211 may transmit and receive packets to and from the host 100. A packet transmitted from the host 1100 to the host interface 1211 may include a command or data to be written to the NVM 1220. A packet transmitted from the host interface 1211 to the host 1100 may include a response to the command or data read from the NVM 1220. The memory interface 1212 may transmit data to be written to the NVM 1220 to the NVM 1220 or receive data read from the NVM 1220. The memory interface 1212 may be configured to comply with a standard protocol, such as Toggle or open NAND flash interface (ONFI).

The FTL 1214 may perform various functions, such as an address mapping operation, a wear-leveling operation, and a garbage collection operation. The address mapping operation may be an operation of converting a logical address received from the host 1100 into a physical address used to actually store data in the NVM 1220. The wear-leveling operation may be a technique for preventing excessive deterioration of a specific block by allowing blocks of the NVM 1220 to be uniformly used. As an example, the wear-leveling operation may be implemented using a firmware technique that balances erase counts of physical blocks. The garbage collection operation may be a technique for ensuring usable capacity in the NVM 1220 by erasing an existing block after copying valid data of the existing block to a new block.

The packet manager 1215 may generate a packet according to a protocol of an interface, which consents to the host 1100, or parse various types of information from the packet received from the host 100. In addition, the buffer memory 1216 may temporarily store data to be written to the NVM 1220 or data to be read from the NVM 1220. Although the buffer memory 1216 may be a component included in the storage controllers 1210, the buffer memory 1216 may be outside the storage controllers 1210.

The ECC engine 1217 may perform error detection and correction operations on read data read from the NVM 1220. More specifically, the ECC engine 1217 may generate parity bits for write data to be written to the NVM 1220, and the generated parity bits may be stored in the NVM 1220 together with write data. During the reading of data from the NVM 1220, the ECC engine 1217 may correct an error in the read data by using the parity bits read from the NVM 1220 along with the read data, and output error-corrected read data.

The AES engine 1218 may perform at least one of an encryption operation and a decryption operation on data input to the storage controllers 1210 by using a symmetric-key algorithm.

In some example embodiments, the storage controller 1210 may extract the error position information EPI about data stored in the nonvolatile memory device 1220 based on the operation method described with reference to FIGS. 1 to 14, may store the extracted error position information EPI in the nonvolatile memory device 1220, and may refine data read from the nonvolatile memory device 1220 by using the error position information EPI.

In some example embodiments, in the storage controller 1210, an area in which the error position information EPI is stored may be managed by the flash translation layer 1214.

Figure 16:
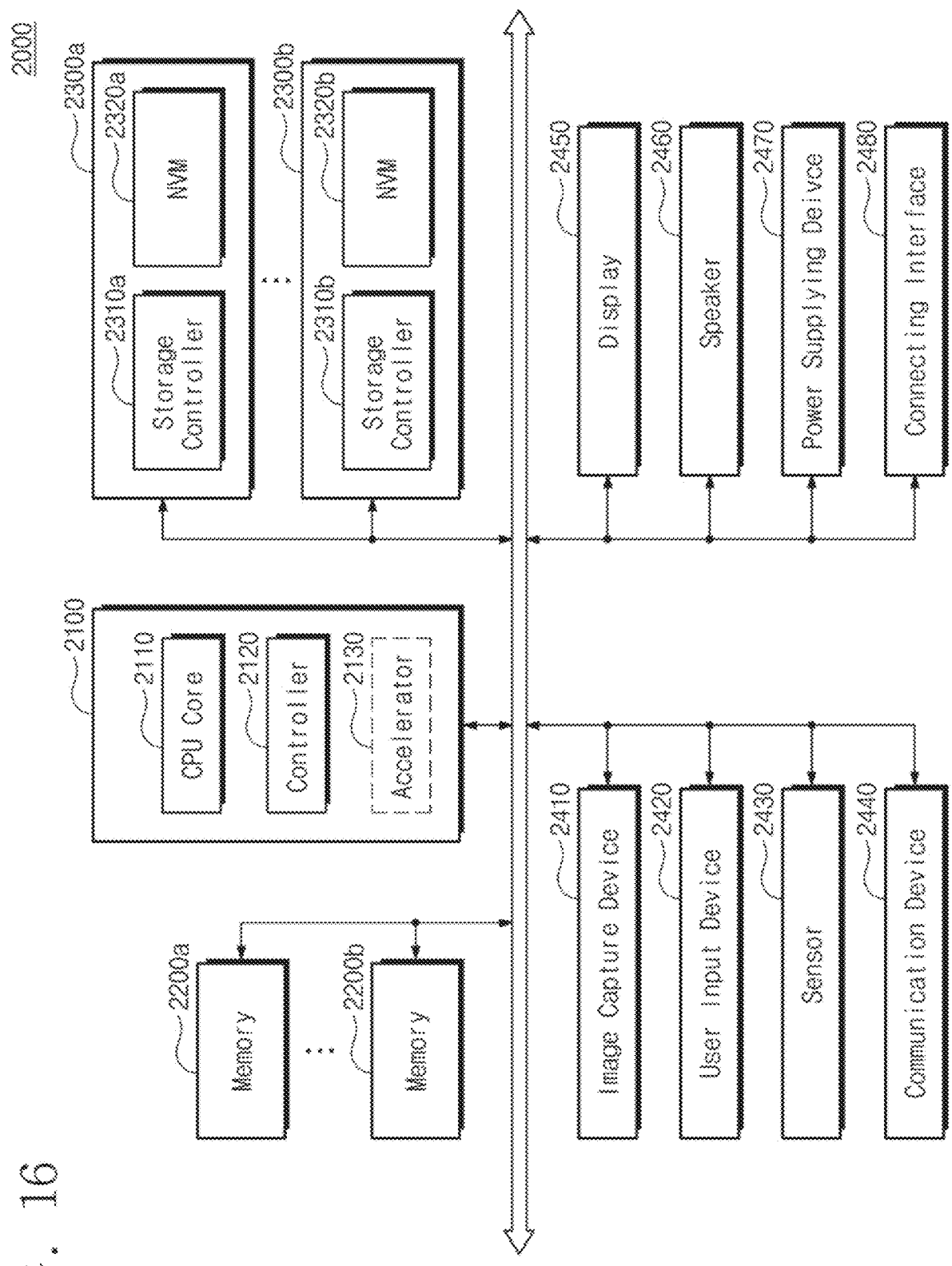
FIG. 16 is a diagram illustrating a system to which a memory system according to some example embodiments of the present disclosure is applied.

FIG. 16 is a diagram of a system 2000 to which a storage device is applied, according to some example embodiments. The system 2000 of FIG. 16 may basically be a mobile system, such as a portable communication terminal (e.g., a mobile phone), a smartphone, a tablet personal computer (PC), a wearable device, a healthcare device, or an Internet of things (IoT) device. However, the system 2000 of FIG. 16 is not necessarily limited to the mobile system and may be a PC, a laptop computer, a server, a media player, or an automotive device (e.g., a navigation device).

Referring to FIG. 16, the system 2000 may include a main processor 2100, memories (e.g., 2200*a* and 2200*b*), and storage devices (e.g., 2300*a* and 2300*b*). In addition, the system 2000 may include at least one of an image capturing device 2410, a user input device 2420, a sensor 2430, a communication device 2440, a display 2450, a speaker 2460, a power supplying device 2470, and a connecting interface 2480.

The main processor 2100 may control all operations of the system 2000, more specifically, operations of other components included in the system 2000. The main processor 2100 may be implemented as a general-purpose processor, a dedicated processor, or an application processor.

The main processor 2100 may include at least one CPU core 2110 and further include a controller 2120 configured to control the memories 2200*a* and 2200*b* and/or the storage devices 2300*a* and 2300*b*. In some example embodiments, the main processor 2100 may further include an accelerator 2130, which is a dedicated circuit for a high-speed data operation, such as an artificial intelligence (AI) data operation. The accelerator 2130 may include a graphics processing unit (GPU), a neural processing unit (NPU) and/or a data processing unit (DPU) and be implemented as a chip that is physically separate from the other components of the main processor 2100.

The memories 2200*a* and 2200*b* may be used as main memory devices of the system 2000. Although each of the memories 2200*a* and 2200*b* may include a volatile memory, such as static random access memory (SRAM) and/or dynamic RAM (DRAM), each of the memories 2200*a* and 2200*b* may include non-volatile memory, such as a flash memory, phase-change RAM (PRAM) and/or resistive RAM (RRAM). The memories 2200*a* and 2200*b* may be implemented in the same package as the main processor 2100.

The storage devices 2300*a* and 2300*b* may serve as non-volatile storage devices configured to store data regardless of whether power is supplied thereto, and have larger storage capacity than the memories 2200*a* and 2200*b*. The storage devices 2300*a* and 2300*b* may respectively include storage controllers (STRG CTRL) 2310*a* and 2310*b* and NVM (Non-Volatile Memory)s 2320*a* and 2320*b* configured to store data via the control of the storage controllers 2310*a* and 2310*b*. Although the NVMs 2320*a* and 2320*b* may include flash memories having a two-dimensional (2D) structure or a three-dimensional (3D) V-NAND structure, the NVMs 2320*a* and 2320*b* may include other types of NVMs, such as PRAM and/or RRAM.

The storage devices 2300*a* and 2300*b* may be physically separated from the main processor 2100 and included in the system 2000 or implemented in the same package as the main processor 2100. In addition, the storage devices 2300*a* and 2300*b* may have types of solid-state devices (SSDs) or memory cards and be removably combined with other components of the system 200 through an interface, such as the connecting interface 2480 that will be described below. The storage devices 2300*a* and 2300*b* may be devices to which a standard protocol, such as a universal flash storage (UFS), an embedded multi-media card (eMMC), or a non-volatile memory express (NVMe), is applied, without being limited thereto.

In some example embodiments, the storage devices 2300a and 2300b may be the memory system or the storage device described with reference to FIGS. 2 to 25. The storage devices 2300a and 2300b may operate based on the operation method described with reference to FIGS. 2 to 25.

The image capturing device 2410 may capture still images or moving images. The image capturing device 2410 may include a camera, a camcorder, and/or a webcam.

The user input device 2420 may receive various types of data input by a user of the system 2000 and include a touch pad, a keypad, a keyboard, a mouse, and/or a microphone.

The sensor 2430 may detect various types of physical quantities, which may be obtained from the outside of the system 2000, and convert the detected physical quantities into electric signals. The sensor 2430 may include a temperature sensor, a pressure sensor, an illuminance sensor, a position sensor, an acceleration sensor, a biosensor, and/or a gyroscope sensor.

The communication device 2440 may transmit and receive signals between other devices outside the system 2000 according to various communication protocols. The communication device 2440 may include an antenna, a transceiver, and/or a modem.

The display 2450 and the speaker 2460 may serve as output devices configured to respectively output visual information and auditory information to the user of the system 2000.

The power supplying device 2470 may appropriately convert power supplied from a battery (not shown) embedded in the system 2000 and/or an external power source, and supply the converted power to each of components of the system 2000.

The connecting interface 2480 may provide connection between the system 2000 and an external device, which is connected to the system 2000 and capable of transmitting and receiving data to and from the system 2000. The connecting interface 2480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 2394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 17:
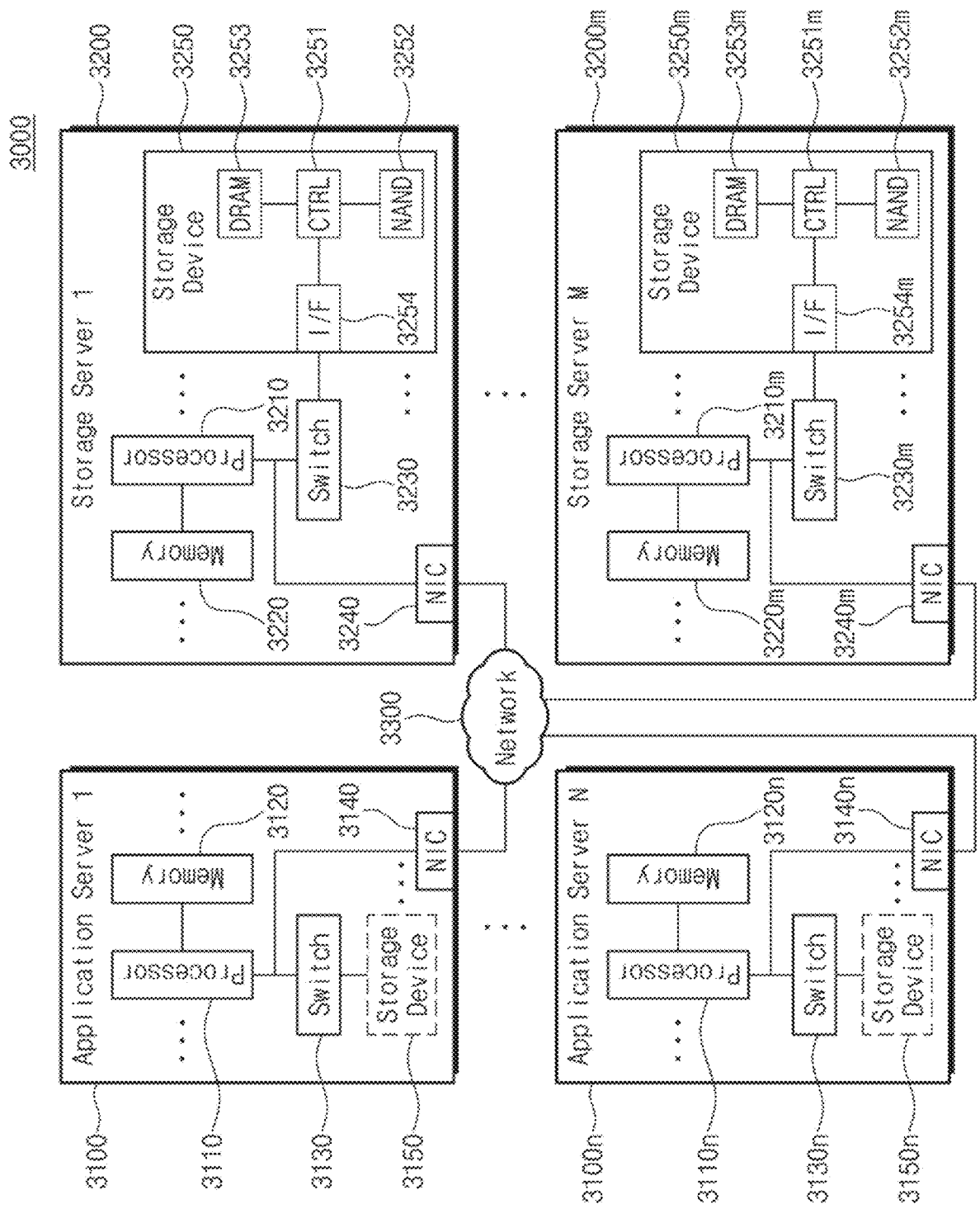
FIG. 17 is a diagram illustrating a data sensor to which a memory device according to some example embodiments of the present disclosure is applied.

FIG. 17 is a diagram of a data center 3000 to which a memory device is applied, according to some example embodiments. Referring to FIG. 17, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to example embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some example embodiments, the numbers of processors 3210 and memories 3220 included in the storage server 3200 may be variously selected. In some example embodiments, the processor 3210 and the memory 3220 may provide a processor-memory pair. In some example embodiments, the number of processors 3210 may be different from the number of memories 3220. The processor 3210 may include a single-core processor or a multi-core processor. The above description of the storage server 3200 may be similarly applied to the application server 3100. In some example embodiments, the application server 3100 may not include a storage device 3150. The storage server 3200 may include at least one storage device 3250. The number of storage devices 3250 included in the storage server 3200 may be variously selected according to some example embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In some example embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In some example embodiments, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC(Network InterConnect) 3240. The switch 3230 may selectively connect the processor 3210 to the storage device 3250 or selectively connect the NIC 3240 to the storage device 3250 via the control of the processor 3210.

In some example embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230, and the storage device 3250.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal. The controller 3251 may control all operations of the storage device 3250. In some example embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

In some example embodiments, each of the storage devices 3150 to 3150n and 3250 to 3250m may be the storage device described with reference to FIGS. 1 to 16, and may be configured to manage error position information based on the operation method described with reference to FIGS. 1 to 16.

The memory controller 110, EPI manager 112, ECC engine 111, memory device 120, memory system 100, ECC decoder 112b, ECC encoder 112a, EPI manage 112, memory cell array 121, control logic/voltage generating circuit 123, page buffer circuit 124, EPI extractor 126, I/O circuit 125, system 1000, storage device 1200, memory device 110, system 2000, the main processor 2100, memories (e.g., 2200a and 2200b), and storage devices (e.g., 2300a and 2300b), the image capturing device 2410, the user input device 2420, the sensor 2430, the communication device 2440, the display 2450, the speaker 2460, the power supplying device 2470, and the connecting interface 2480, data center 3000, subcomponents or other circuitry discussed herein) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to the present disclosure, a memory controller may extract error position information about data stored in a memory device and may store the extracted error position information in the memory device. The memory controller may refine an error of read data by using the error position information stored in the memory device and may perform an error correction operation on the refined data. In this case, the ability to correct an error of data may be improved, and thus, an operation method of the memory controller configured to control the memory device having improved reliability is provided.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. An operation method of a memory controller which is configured to control a memory device, the method comprising:
storing write data in a first area of the memory device;
extracting first error position information indicating a position of at least one error included in data stored in the first area; the extracting the first error position information being performed in response to the storing the write data, storing the first error position information in a second area of the memory device;

reading read data from the first area of the memory device;

reading the first error position information from the second area of the memory device;

refining the read data based on the first error position information to generate refined data;

performing soft decision decoding based on the refined data to generate corrected data; and outputting the corrected data.

2. The method of claim 1, wherein the extracting of the first error position information includes:

reading data from the first area;

comparing the read data and the write data to generate first error data; and generating the first error position information based on the first error data.

3. The method of claim 1, wherein the extracting of the first error position information includes:

reading a plurality of read data from the first area based on a plurality of read voltages; and generating the first error position information based on the plurality of read data.

4. The method of claim 1, wherein the extracting of the first error position information includes:

reading data from the first area;

performing the soft decision decoding based on the read data to detect an error of the read data; and generating the first error position information based on the detected error.

5. The method of claim 1, wherein the extracting of the first error position information is performed immediately after the storing of the write data in the first area of the memory device is performed.

6. The method of claim 1, wherein the extracting of the first error position information is performed after a given time passes from performing the storing of the write data in the first area of the memory device.

7. The method of claim 1, wherein the first area corresponds to a first word line of a first memory block of the memory device, and wherein the extracting of the first error position information is performed after a program operation associated with word lines adjacent to the first word line from among a plurality of word lines of the first memory block is completed.

8. The method of claim 1, wherein the first area corresponds to a first word line of a first memory block of the memory device, and wherein the extracting of the first error position information is performed after a program operation associated with a plurality of word lines of the first memory block is completed.

9. The method of claim 1, wherein the first area corresponds to a first word line of a first memory block of the memory device, wherein the second area corresponds to a second word line of the first memory block of the memory device, and wherein the second word line is an uppermost word line or a lowermost word line of the first memory block.

10. The method of claim 9, wherein each of memory cells connected with the first word line stores n bits (n being a natural number more than 2), and wherein each of memory cells connected with the second word line stores m bits (m being a natural number less than n).

11. The method of claim 1, wherein the first area corresponds to a first word line of a first memory block of the memory device, and wherein the second area corresponds to a second word line of a second memory block of the memory device.

12. An operation method of a memory controller which is configured to control a memory device, the method comprising:

transmitting a first program command, a first address, and first write data to the memory device;

transmitting a first read command and the first address to the memory device to receive first read data from the memory device, the transmitting the first read command being performed in response to the transmitting the first program command;

comparing the first read data and the first write data to extract first error position information about a position of at least one error included in the first read data; and transmitting a second program command, a second address, and the first error position information to the memory device.

13. The method of claim 12, further comprising:

after the transmitting of the first program command, the first address, and the first write data to the memory device, transmitting a status read command to the memory device to receive status information from the memory device, wherein, based on completion of the status information indicates program, the transmitting of the first read command and the first address to the memory device to receive the first read data from the memory device is performed immediately after receiving the status information.

14. The method of claim 12, further comprising:

after the transmitting of the first program command, the first address, and the first write data to the memory device, transmitting a third program command, a third address, and second write data to the memory device, wherein the transmitting of the first read command and the first address to the memory device to receive the first read data from the memory device is performed after the transmitting of the third program command, the third address, and the second write data to the memory device.

15. The method of claim 14, wherein the first address corresponds to a first word line of a first memory block of the memory device, wherein the second address corresponds to a second word line of the first memory block of the memory device, wherein the third address corresponds to a third word line of the first memory block of the memory device, and wherein the first and third word lines are word lines adjacent to each other, and the second word line is an uppermost word line or a lowermost word line of the first memory block.

16. The method of claim 12, further comprising:

transmitting a second read command and the first address to the memory device to receive second read data from the memory device;

transmitting a third read command and the second address to the memory device to receive the first error position information from the memory device;

refining an error of the second read data based on the first error position information to generate refined data; and performing soft decision decoding on the refined data to output corrected data.

17. An operation method of a memory controller which is configured to control a memory device, the method comprising:

performing a first read operation on a first area of the memory device to read first read data;

performing a plurality of second read operations on the first area of the memory device to read a plurality of soft decision data, based on an error of the first read data not being corrected through a first error correction operation for the first read data;

performing a second read operation on a second area of the memory device to read error position information;

refining at least one of the plurality of soft decision data based on the error position information to generate a plurality of refined soft decision data; and performing a second error correction operation on the plurality of refined soft decision data to output corrected data.

18. The method of claim 17, wherein the error position information indicates a position of at least one error included in data stored in the first area of the memory device.

19. The method of claim 17, further comprising:

before the performing of the first read operation, performing a first program operation on the first area of the memory device to store first write data;

performing a third read operation on the first area of the memory device to read second read data in response to the performing the first program operation;

generating the error position information based on the second read data and the first write data; and performing a second program operation on the second area of the memory device to store the error position information.

20. The method of claim 17, further comprising:

before the performing of the first read operation, performing a first program operation on the first area of the memory device to store first write data;

performing a status read operation on the memory device to receive a result of the first program operation and the error position information; and performing a second program operation on the second area of the memory device to store the error position information.

* * * * *